(12) United States Patent
Seith et al.

(10) Patent No.: US 11,573,553 B2
(45) Date of Patent: Feb. 7, 2023

(54) PORTABLE CALIBRATION SYSTEM

(71) Applicant: Ingersoll-Rand Industrial US, Inc., Davidson, NC (US)

(72) Inventors: Warren A. Seith, Bethlehem, PA (US); Jason D Urban, Kintnersville, PA (US)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 102 days.

(21) Appl. No.: 16/587,411

(22) Filed: Sep. 30, 2019

(65) Prior Publication Data
US 2021/0132569 A1 May 6, 2021

(51) Int. Cl.
| | |
|---|---|
| *G05B 19/401* | (2006.01) |
| *G01L 3/00* | (2006.01) |
| *B25B 23/147* | (2006.01) |
| *G06Q 10/08* | (2012.01) |
| *B25B 23/00* | (2006.01) |
| *B25F 5/02* | (2006.01) |

(52) U.S. Cl.
CPC .......... *G05B 19/401* (2013.01); *B25B 23/147* (2013.01); *G01L 3/00* (2013.01); *G06Q 10/083* (2013.01); *B25B 23/0078* (2013.01); *B25F 5/026* (2013.01); *G05B 2219/31304* (2013.01)

(58) Field of Classification Search
CPC ........ G05B 19/401; G05B 2219/31304; B25B 23/147; B25B 23/0078; G01L 3/00; G01L 5/0042; G01L 25/003; G06Q 10/083; B25F 5/026
See application file for complete search history.

(56) References Cited

U.S. PATENT DOCUMENTS

| | | |
|---|---|---|
| 5,172,774 A | 12/1992 | Melrose |
| 2003/0009262 A1 | 1/2003 | Colangelo, III et al. |
| 2003/0116335 A1* | 6/2003 | Milbourne ............ B25F 5/026 173/170 |

(Continued)

FOREIGN PATENT DOCUMENTS

WO  0230624 A2  4/2002

OTHER PUBLICATIONS

DEPRAG—Measurement Devices for Manual Use for Precise Highly Dynamic Torque Measurement from: https://www.deprag.com/fileadmin/bilder_content/emedia/broschueren_pics/emedia_schraubtechnik/D3022/D3022en.pdf; Downloaded Jun. 6, 2019.

(Continued)

*Primary Examiner* — Santosh R Poudel
(74) *Attorney, Agent, or Firm* — Kevin E. West; Advent, LLP

(57) ABSTRACT

A portable shippable automated calibration system for high torque power tools is disclosed. The system includes a self-contained highly durable and shippable container that may comprise a power source, central processor, visual user interface, mechanical interface for coupling with power tools to be calibrated, communications systems for communicating with a power tool being calibrated and/or with on-site or cloud based data systems. The system may be delivered to sites desiring on-site power tool calibration, tools are calibrated and updated calibration factors are automatically uploaded into the calibrated tool and a calibration certificate is published with the particulars of the calibration completion.

10 Claims, 17 Drawing Sheets

(56) References Cited

U.S. PATENT DOCUMENTS

| | | | | |
|---|---|---|---|---|
| 2004/0220762 | A1* | 11/2004 | Oeflein | G01R 35/005 |
| | | | | 702/107 |
| 2007/0171380 | A1* | 7/2007 | Wright | G03B 37/04 |
| | | | | 353/69 |
| 2014/0119575 | A1* | 5/2014 | Conrad | H02J 7/04 |
| | | | | 381/150 |
| 2014/0331829 | A1* | 11/2014 | King | B25B 23/1422 |
| | | | | 81/467 |
| 2015/0168245 | A1* | 6/2015 | Nichols | G01L 25/003 |
| | | | | 73/1.09 |
| 2016/0161354 | A1* | 6/2016 | Jiang | G01L 25/003 |
| | | | | 73/1.12 |
| 2016/0354888 | A1* | 12/2016 | Huber | F16D 48/06 |
| 2018/0333831 | A1* | 11/2018 | Lee | G01L 25/003 |
| 2019/0101463 | A1* | 4/2019 | Fly | B25B 13/48 |

OTHER PUBLICATIONS

QX Series Cordless Torque Multiplier Brouchure from: Ingersoll Rand, irtools.com/QX Multiplier; IRITS-1116-212-0918.

QX Tool Calibration Brochure from: Ingersoll Rand, Power Tools Technical Customer Service.

QXM Case Study, Sophisticated Fastening Tools Improve Heavy Equipment Manufacturing and Maintenance; by Steve Diacumakos, Global Portfolio Leader, Industrial MRO and Applied Power Products and Director, Product Management and Marketing; Ingersoll Rand Power Tools.

Strain Gage Based Transducers, Their Design and Construction from: http://www.measurementsgroup.com/guide/ta/sgbt/sgbtndex.htm; Downloaded Jun. 3, 2019.

Air Automation Engineering, Assembly Tool Calibration; from https://airautomation.com/assembly-tool-calibration; Downloaded Dec. 17, 2019.

Christie Total Torque Solutions; Torque Tool Calibration Table; from http://www.wchristie.com/torque-tool-calibration-table.html; Downloaded Dec. 17, 2019.

Pro Torque Tools; CDI Motorized Multitest Torque Calibration System-2800-1 from; https://www.protorquetools.com/cdi-motorized-multitest-torque-calibration-system-2800-1/?gclid=CjwKCAjwgabeBRBuEiwACD4R5p9gcEYct_SIU3INZc8gcutsoUDVBS7co_p1B-zvEVkrk9XfepfgjRoCzLgQAvD_BwE; Downloaded Dec. 17, 2019.

Sushma Industries, Torque Wrench Testing & Calibration Systems from; https://www.sushmaindustries.com/product-vertical/torque-tool-testing-systems; Downloaded Dec. 17, 2019.

Transcat, Calibrations Services from; http://www.transcat.com/?st-t=adword_google_&_bt=182591126368&_bk=transcat%20rochester%20ny&_bm=e&pi_ad_id=182591126368&gclid=CjwKCAjwgabeBRBuEiwACD4R5n9QXOIi_5-LuN0SL3XjxqZ1-sV9TSVLGfcnrU5W_yJiQYSW94PrlRoCkl4QAvD_BwE; Downloaded Dec. 17, 2019.

* cited by examiner

PORTABLE CALIBRATION SYSTEM

FIELD OF THE DISCLOSURE

The present disclosure relates to the field of power tool calibration, particularly to systems and methods to provide efficient and cost-effective calibration of high torque power tools at distributed or remote sites.

BACKGROUND

The use of high torque assembly tools is an important part of manufacturing and other fastening processes. The manufacture or assembly of many devices requires application of pre-determined and specifically engineered torque loads to the fasteners of the devices. Fastening at designed torque levels is essential not only for reliability of the fastening but also for safety in many devices. It is well known that high torque assembly tools used in such applications require regular calibration to ensure that the tools deliver the pre-determined torque loads to the fasteners on which they are used.

The process of calibrating assembly tools, particularly high torque assembly tools, is complicated. Many tool owners rely on a third-party calibration specialists to perform this service on their tools. Since high torque assembly tools require regular calibration, many tool owners must expend significant budgets to either pay third-party calibration specialists to perform the calibration service or to buy expensive calibration equipment and train themselves to calibrate their own high torque assembly tools. Cost effective and regular assembly tool calibration is further hindered by the fact that many high torque assembly tools are used at sites—such as on pipelines, windfarms, or remote construction sites—remote from third party calibration sites and in some instances remote from any substantial tool service sites.

Therefore, there is a need for a reliable, efficient, and cost-effective calibration system for high torque tools that can be used in remote sites without the need of third-party calibration services and also without the need of advanced training for self-calibrating tool owners.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure relates to a portable, shippable calibration system for power tools, including particularly, high torque power tools. The system may comprise unique electrical and mechanical components and systems in a robust shipping case which is easily transportable and shippable but also protects the hardware during shipping. Embodiments of the system can be shipped to virtually any customer site needing calibration updates on their power impact tools. For example, in some instances, a supply site, whether local or centralized, of portable, shippable calibration systems can be maintained and power tool users desiring calibration of their tools can simply request shipment and delivery of the portable and shippable calibration system from the supply site. When the shippable calibration system is received, the user can, with the automatic features of the present system, conduct her/his own calibration on the power tools and self-certify the calibration. After the calibration, the shippable calibration system can be shipped back to the local or centralized supply or shipped directly to another tool owner who has also requested shipment and delivery of the calibration system. Using this system, a power tool user need not purchase her/his own calibration equipment, but can simply request shipment of the present calibration system and use the system's automated controls to calibrate and certify power tools on site at the tool user's scheduling convenience. Accordingly, the present disclosure provides a simple, easy-to-use, mobile high torque power tool calibration system.

With this system a power tool user can avoid the disadvantages of previous systems which may require periodically shipping each power tool to a regional lab for calibration and certification, which would require the user maintain redundant tools to be used while other tools are sent off for calibration. Other disadvantageous previous calibration options included scheduling and paying for a calibration services vendor to travel to the user's tool, assembly, or work site so that the third party calibration services vendor could conduct the necessary tool calibration using the service company's equipment which typically required trained and certified calibration technicians. Again, these third party calibration services were subject to the third party's scheduling and work requirements. Lastly, a tool owner or user could purchase her/his own calibration system, which systems are typically large and complicated, and then conduct and maintain training and certification of her/his own employees to conduct calibration using the purchased calibration system. But even this last option does not answer the needs of many assembly and fastening operations that are conducted away from even the user's calibration labs such as fastening operation along pipelines crossing the country or at remote wind farms or other construction or assembly sites.

With the present system a tool user can self-certify her/his high torque power tool calibrations at her/his own scheduling convenience and at any location. Thus, the tool user avoids the numerous disadvantages and expenses of the prior calibration system 10 requirements.

The present shippable calibration system may be self-contained and include everything necessary to conduct calibration operations on even very sophisticated high torque power tools. Further, the present system may comprise control systems that automate much of the calibration process and lead the operator through the calibration process so that a high level of calibration training or certification is not required to self-certify the calibration of the tools. Further, a controlled environment, such as a laboratory or tool shed, is not required for calibrations according to the present system thus facilitating calibration at virtually any remote work site such as a pipeline or windfarm. The self-contained and highly portable aspects of the present system also provide clear advantages in an assembly plant environment. With the present system calibration procedures can be conducted at times along the assembly line or process that do not interrupt normal assembly operations and that do not require removal of the tools from the "floor" of the assembly line or other assembly site as the portable calibration system may be brought directly to the tool location at the assembly line or assembly site.

The robust shipping case may include everything needed to perform a torque calibration of a high torque, precision assembly tool. The system may comprise hardware such as torque transducers, appropriate sizing couplings, controller with signal processor display, mechanical tool interface, electrical tool interface cable and wireless connectivity devices, communications capabilities to conduct data transfer with the particular tool being calibrated to identify the tool and its particular design characteristics, tool settings and other data that may be held by the tool. Additionally, the system has communications capabilities to communicate to local or on-site data (such as an assembly plant's data systems) or to communication via wireless or cellular protocols to remote storage such as the "cloud".

A first aspect is directed to a portable high torque power tool torque calibration system, comprising: a portable shippable container in which are mounted a mechanical tool interface, a user interface and central processor unit; the mechanical interface couplable to a high torque power tool to be calibrated and configured such that the mechanical interface simultaneously locks the power tool against spinning and receives torque output from an output spindle of the power tool; the mechanical interface further comprising a torque transducer operatively connected to the central processor; the central processor configured to process signals received from the torque transducer and calculate and upload to the power tool being calibrated a calibration correction factor specific to the power tool being calibrated.

In another aspect, the system further comprises: an electronic data physical connection port mounted to the calibration system and configured to be connected via data cable to an electronic data physical connection port of a power tool being calibrated; and wherein the central processor is configured to download specific tool identification information from a power tool being calibrated via the electronic data physical connection port.

In another aspect, the central processor is configured to upload at least one calibration correction factor to a power tool being calibrated, such calibration correction factor being specific to the particular power tool and a targeted output torque of the power tool.

In another aspect, the mechanical interface comprises both a female reaction collar coupling and a square spindle female coupling jointly mounted to simultaneously couple with a male reaction collar and a male square output spindle of a power tool.

In another aspect, the central processor is configured to receive a target torque setting from a power tool being calibrated, to process signals from the torque transducer and to calculate a calibration correction factor based on the signals and the target torque and specifics of the power tool, and to upload the calculated calibration factor to the power tool.

In another aspect, the central processor, based on data downloaded from the power tool being calibrated, is configured to identify an appropriate calibration process for the particular power tool being calibrated; and is further configured to activate a trigger actuator coupled to a trigger of the power tool, to identify when the tool control unit determines that the tool has reached its target torque output, to process signals received from the torque transducer to determine the actual torque received at the mechanical interface from the power tool operating at its target torque output, to compare the actual torque with the target torque, to compute a new calibration correction factor for the power tool at [at that target torque output], and to upload the new calibration correction factor to the data memory unit of the power tool.

In another aspect, the calibration system further comprising a top plate to which the female reaction collar coupling is mounted and against which the torque transducer is arrested.

In another aspect, the female square spindle coupling has an axis through the center of the coupling and the coupling is configured in a spindle receiving body partially rotatable about the axis of the female square spindle coupling.

In another aspect, the spindle receiving body is mounted on at least one bearing and is at least partially rotatable about the axis of the female square spindle coupling.

In another aspect, the body further comprises a torque transducer positioned to at least partially rotate about the axis of the female square spindle and is also arrested against rotation by at least one arresting block mounted to the plate.

In another aspect, the system is configured such that a power tool can be coupled to the female reaction collar coupling and the female output spindle coupling, the power tool power source activated, the power tool providing a target torque output to the female square coupling that is measured by the torque transducer.

Another aspect is directed to a method of providing distributed self-certification of high torque power tools by tool operators, the method comprising: providing at a supply site a portable self-contained calibration system comprising a shippable durable container in which is mounted an automated high torque power tool calibration system; receiving a request from a tool operator at a location remote from the supply site for shipment of the calibration system; shipping the calibration system to the tool operator at the remote location; receiving the calibration system at the remote location; connecting a power tool to be calibrated to the automatic calibration system; calibrating the power tool using the automated calibration system; storing a torque calibration certificate issued by the calibration system; and returning the calibration system to the supply site.

In another aspect, the step of connecting a power tool to be calibrated to the automatic calibration system further comprises connecting a data communications cable from the calibration system to the power tool and coupling the power tool to a mechanical interface of the calibration system such that the mechanical interface simultaneously locks the power tool against spinning and receives torque output from an output spindle of the power tool.

In another aspect, the step of calibrating the power tool using the automated calibration system further comprises downloading tool specific identifying information from the power tool to the calibration system over the connected data communications cable; the calibration system determining a recommended calibration protocol for the specific power tool based in part on the downloaded tool specific identifying information; the calibration system identifying a target torque setting of the power tool from data downloaded from the power tool; the calibration system activating a trigger actuator coupled to the power tool; the power tool motor providing torque to the output spindle of the power tool until an electronic control system of the power tool determines that the power tool target torque output has been achieved; the torque from the power tool output spindle being transferred to a calibration system torque transducer; signals from the calibration system torque transducer being monitored by a central processor during the period of the power tool providing torque output to the calibration system; the central processor processing the signals from the torque transducer to determine the actual torque output received from the power tool at the calibration system and comparing the actual torque to the power tool target torque; the central processor calculating a correction factor to be applied by the power tool to bring the power tool actual torque output into acceptable correlation with the target torque of the power tool; the calibration system uploading the calculated correction factor to the power tool electronic control system; the calibration system uploading a calibration certificate verifying the completed calibration of the power tool.

In another aspect, the calibration system uploads a calibration certificate relating to the power tool to data records accessed via the cloud by way of a cellular data system embodied in the calibration system.

In another aspect, the calibration system checks the power tool firmware and determines if a power tool firmware update is recommended and, at the option of the tool operator, uploads updated firmware to the power tool.

In another aspect, the calibration system accesses data records via the cloud to help determine whether a firmware update for the power tool is recommended and to download a recommended firmware update.

In another aspect, the calibration system performs the calibration using self contained battery power without accessing an external power source.

Another aspect is directed to a portable high torque power tool torque calibration system, comprising: a portable shippable container in which are mounted a mechanical tool interface, a user interface and central processor unit; the mechanical interface couplable to a high torque power tool to be calibrated and configured such that the mechanical interface simultaneously locks the power tool against spinning and receives torque output from an output spindle of the power tool; the mechanical interface further comprising a torque transducer operatively connected to the central processor; the central processor configured to process signals received from the torque transducer and calculate and upload to the power tool being calibrated a calibration correction factor specific to the power tool being calibrated; and the calibration system configured to automatically conduct the calibration of a high torque power tool using only power from a self-contained battery system in the calibration system and without the use of an external power supply.

Additional novel and advantageous aspects of various embodiments of the present disclosure will be apparent to one of ordinary skill in the art in view of the drawings and the detailed description.

BRIEF DESCRIPTION OF THE DRAWINGS

The accompanying drawings illustrate implementations of the concepts conveyed in the present disclosure. Features of the illustrated implementations can be more readily understood by reference to the following description taken in conjunction with the accompanying drawings.

DETAILED DESCRIPTION

Figure 3:
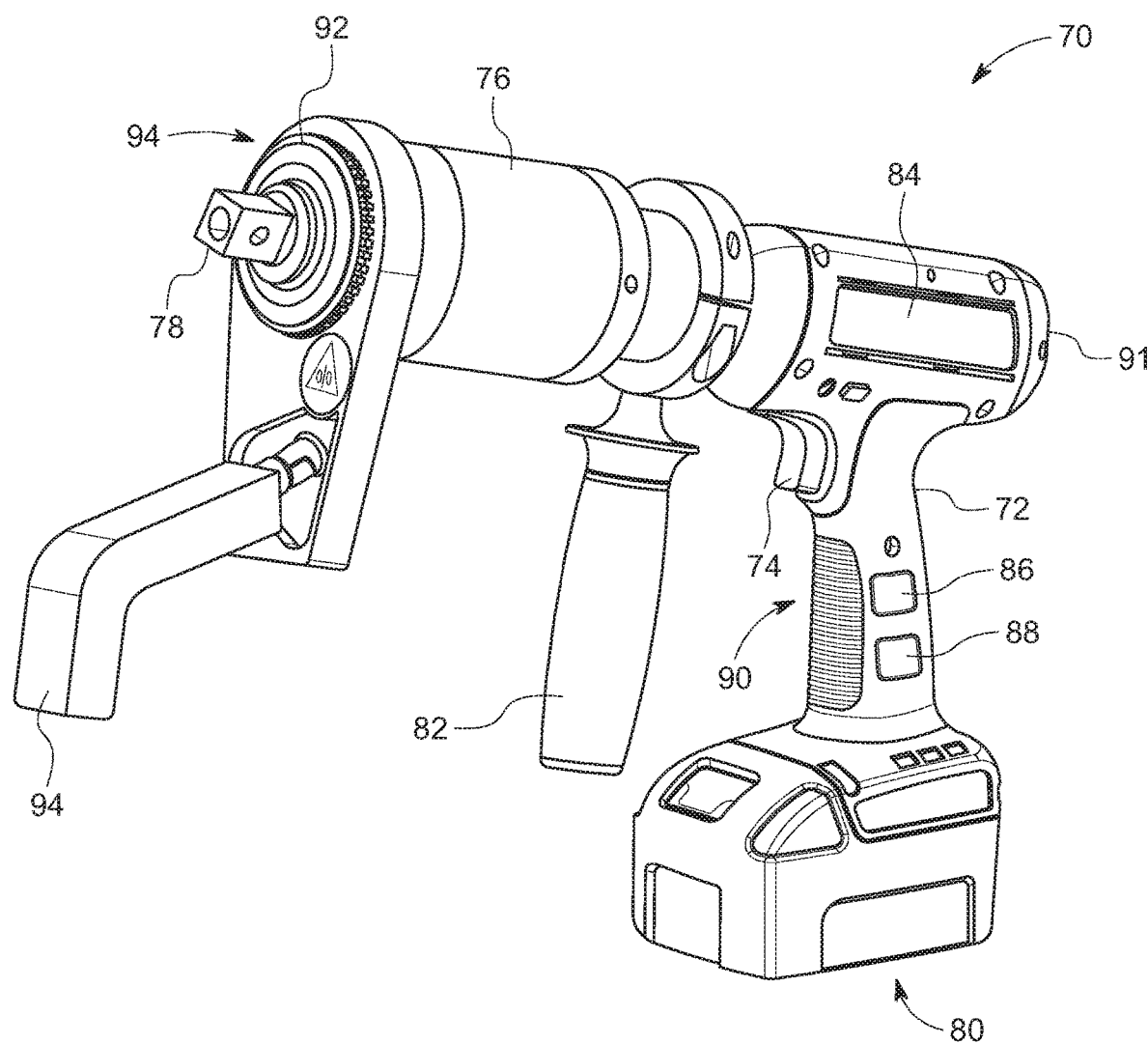
FIG. 3 illustrates an example representation of a high torque power tool that may be calibrated in accordance with the present disclosure.
Figure 4:
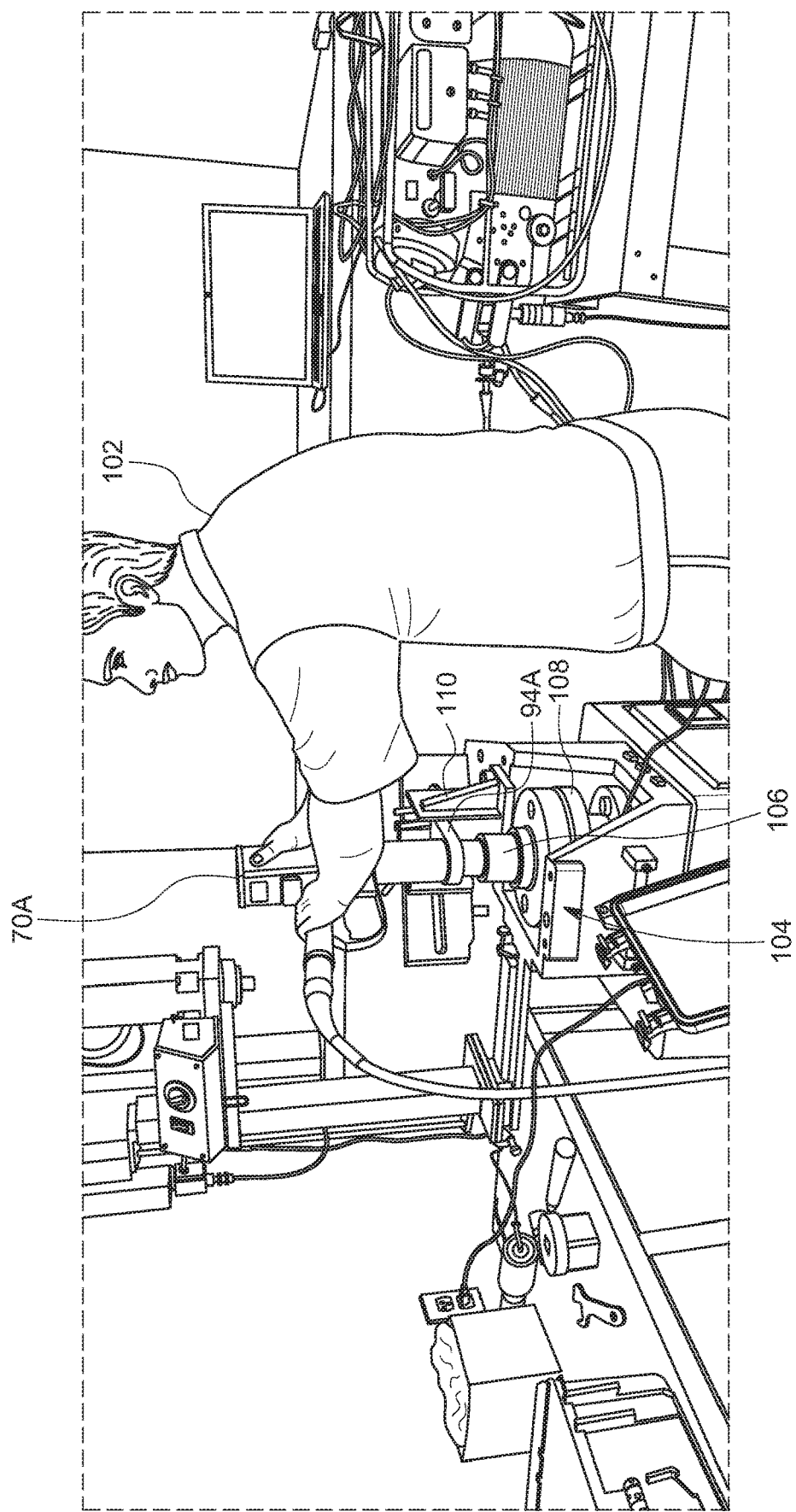
FIG. 4 illustrates an exemplary non-portable and non-shippable calibration system.
Figure 5:
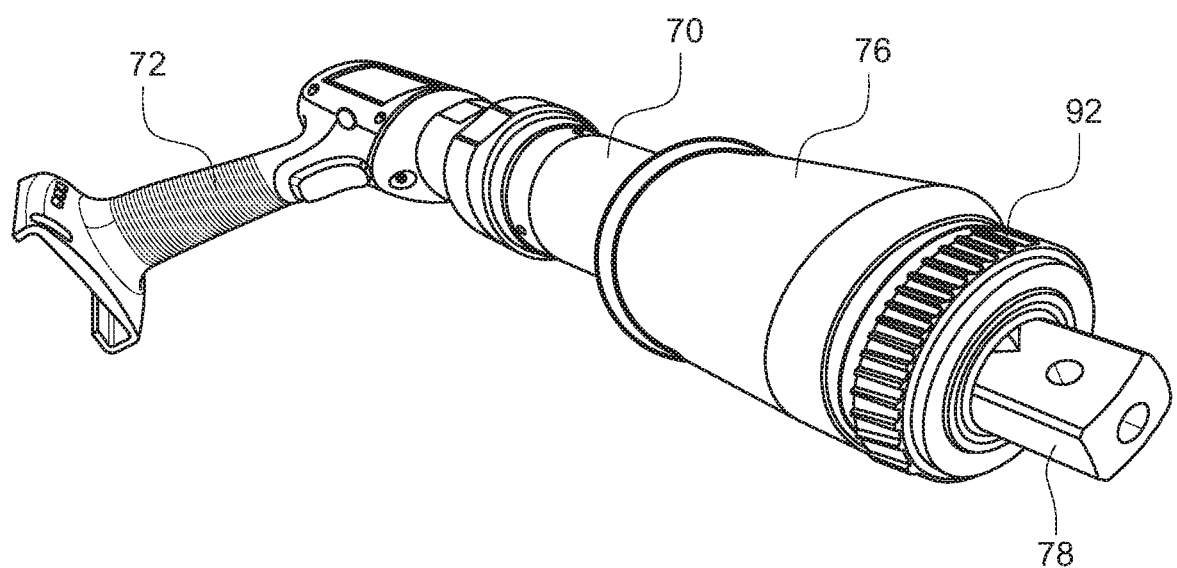
FIG. 5 illustrates a high torque power tool without a reaction arm attached.

The portable and shippable calibration system 10 of the present disclosure may be used with high torque power tools such as discussed in conjunction with FIGS. 3 and 5 and provides a much improved and efficient calibration system 10 than is provided in traditional high torque power tool calibration systems such as discussed in conjunction with FIG. 4.

Figure 1:
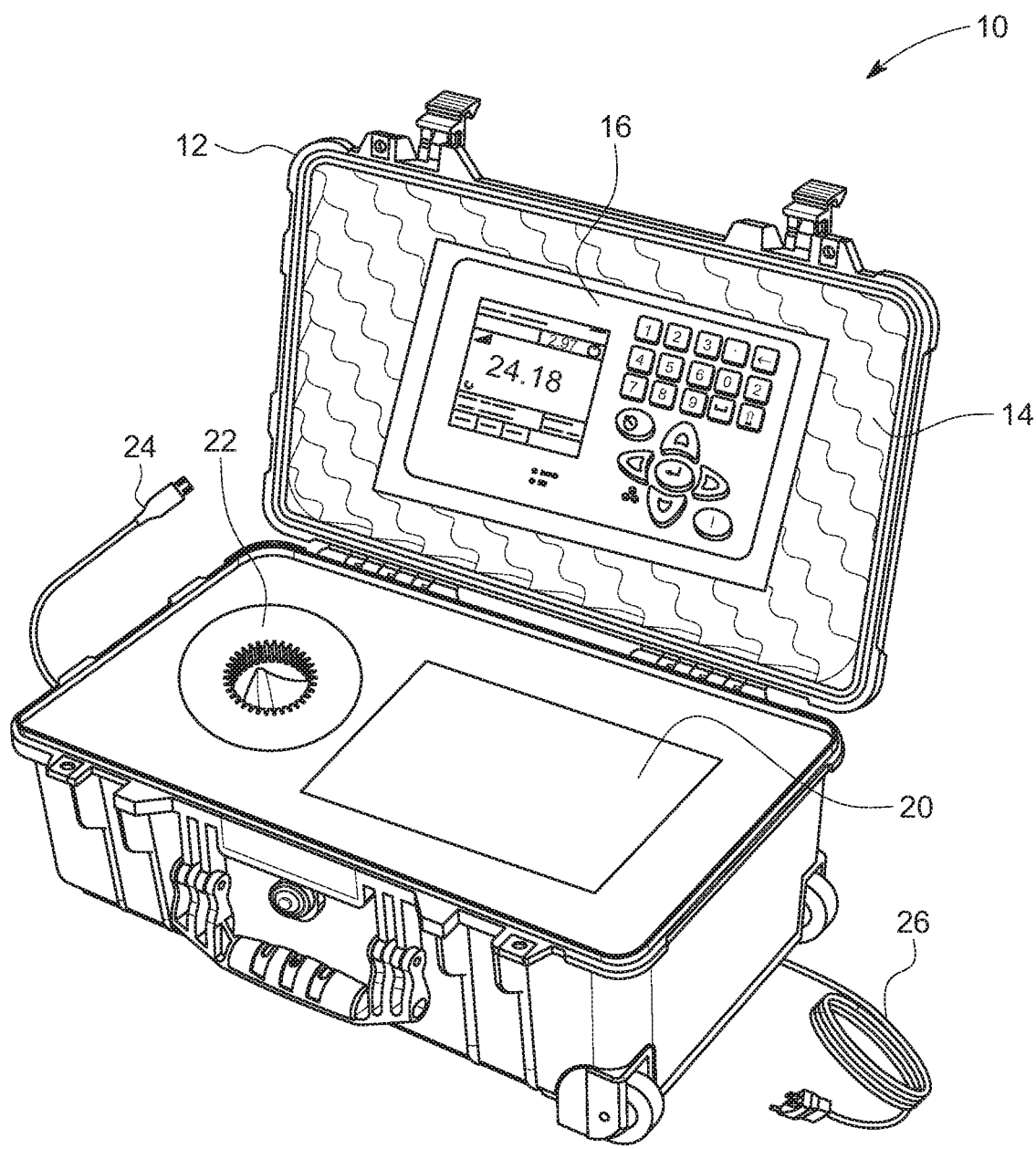
FIG. 1 illustrates an example of a portable shippable calibration system according to certain embodiments of the present disclosure.
Figure 2:
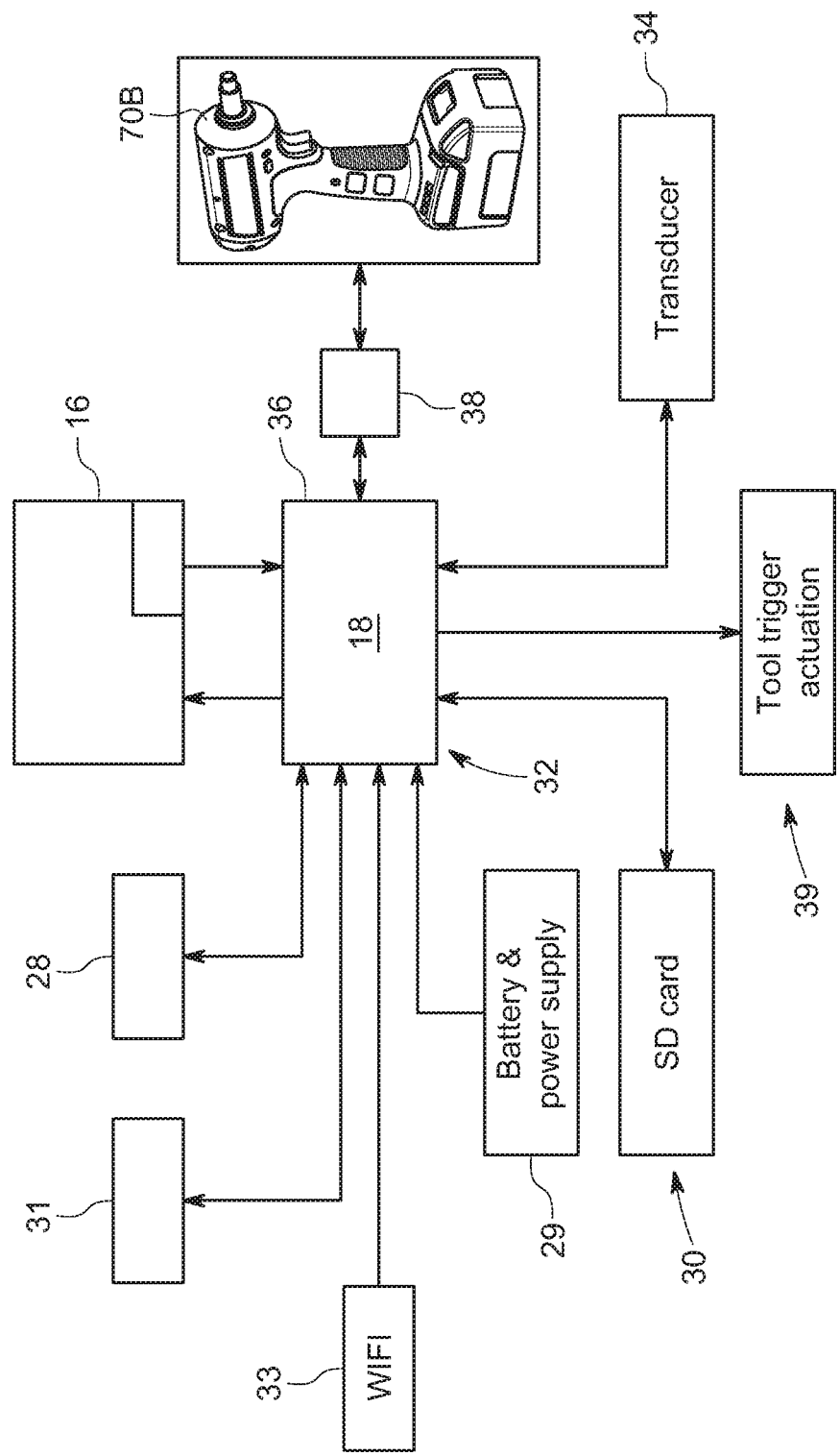
FIG. 2 illustrates a schematic of certain components of some embodiments of the present disclosure.

An exemplary mechanical layout of an embodiment of a portable and shippable calibration system 10 according to the present disclosure is shown in FIG. 1 and a schematic of corresponding electrical components of an embodiment of the calibration system 10 is shown in FIG. 2.

FIG. 1 shows a mechanical layout representation of an example of a portable shippable power tool calibration system 10 according to certain embodiments of the present disclosure. Shown is a durable, portable and shippable case 12 which may comprise a cushioned interior 14 and in which may be mounted a user interface 16 which is operatively coupled to a central processor 18 (shown in FIG. 2) also mounted in the shippable case 12, a battery or other power supply compartment 20, a mechanical tool interface 22, a detachable USB connector 24, and a detachable power cord 26. The calibration system 10 may be entirely self-contained within the durable shippable case 12.

FIG. 2 shows a schematic electrical layout of an embodiment of a portable shippable power tool torque calibration system 10 according to the present disclosure and shows additional components, capabilities and features of the embodiment of FIG. 1. The central processor 18, which may also comprise data memory and operating system data storage, may be securely mounted in the shippable case 12 and operatively connected to the user interface 16 which may comprise an LCD and various user input features such as buttons for alpha-numeric input to the processor and navigation buttons. In some embodiments the user interface 16 may also include a touch screen and in some embodiments may entirely comprise a touch screen interface. Also operatively connected to the central processor 18 may be a port 32 for a data storage device, which in some embodiments may comprise removable data storage devices 30 such as an SD card.

The central processor 18 is also operatively coupled to a transducer 34 so as to receive transducer 34 output signals related to the value of the torque or stress applied to the transducer 34 by the power tool 70 during power tool calibration. The central processor 18 operating programs calculate the torque applied to the transducer 34 based on the transducer 34 output signals and previous calibration of the of the transducer 34 in the calibration system 10.

The calibration system 10 may also comprise system-to-tool communication capability to communicate between the calibration system 10 (including with the central processor 18) and a power tool 70B (or 70 of FIG. 3) being calibrated. FIG. 2 shows an example of such a system-to-tool communication system, showing USB port 36 operatively coupled to the central processor 18. USB cable 38 is coupled to USB port 36 and is operatively coupled to a USB port (not shown) in the exemplary power tool 70B. The system-to-tool communications system may be a physical (wired) system (such as USB) of any protocol. The system-to-tool communications system may also comprise a wireless link such as Bluetooth or other wireless protocol communications link.

The calibration system 10 may also comprise system-to-facilities communications capabilities which may communicate with facilities where the calibration system 10 is being used to calibrate power tools or resources accessed via the cloud. Such system-to-facilities communications links may include WIFI 33 or any other acceptable protocol including, for example, internet, FieldNet, Ethernet or other protocols. Further the system-to-facilities communications capabilities may comprise cellular communications capabilities 31 which may communicate with systems and data records on the cloud. Via the system-to-communications systems the calibration system 10 can communicate data to and from power tool user facility computer and data systems and data storage and also with the internet and cloud data storage.

The calibration system 10 may also comprise Global Positioning System (GPS) capabilities 28 so that the geo-location of each tool at the time of calibration (as well as the location of the calibration operations) can be automatically and accurately established. The GPS capability or unit may be operatively coupled to the central processor 18 to provide appropriate location data to the central processor 18.

The calibration system 10 also comprises updatable programmed systems to start up and operate the calibration system 10, guide a user through the steps of calibrating one or more power tools, access and store data on each power tool 70B (or 70), and access on-site, cloud or other databases to download from data archives data relating to the power tools and upload data regarding the power tools (including data relating to the calibration of the power tool 70B (or 70)). Further, the calibration system may also update any power tool 70 firmware or other software.

Accordingly, the present calibration system 10 can provide wired, wireless, cellular or other connectivity to data records to access all service records for a power tool 70 being calibrated, create an archive or cloud a record for each tool of where calibrated, what tool was calibrated, date of calibration, and/or calibration results. The system among other things can call down data from the archive, use power tool birth certificate, and update calibration data for any calibrated tool.

The calibration system 10 may also comprise an adaptable power supply 35 to be used with a variety of power tools being calibrated and which may be configured to automatically adjust voltage and amperage supply to substitute for a power tool battery 80 (shown in FIG. 3) (so that local calibration operations using the present calibration system 10 will not be held up by lack of an available charged battery).

The calibration system 10 may also comprise a tool trigger actuator 39 in operative communication with the central processor 18. The tool trigger actuator 39 may comprise a solenoid trigger actuator that as operated by the central processor 18 can control the trigger actuation of a power tool 70 being calibrated to accomplish full trigger power actuation and appropriate start and end of trigger actuation in synchronization with the appropriate stages in the calibration process. The tool trigger actuator 39 may serve to reduce human or operator error in the calibration processes accomplished using the present calibration system 10.

The calibration system 10 may also comprise a battery 29 that serves to power the calibration system 10 to accomplish calibration processes even without availability of an AC electric power supply at the calibration site, such as at a remote assembly or construction site or at other locations on an assembly site with limited access to AC power. Furthermore, the calibration system 10 may comprise an AC electric power connection 26 and/or transformer to utilize local AC power to operate the calibration system 10 and/or to recharge the calibration system 10 battery 29.

FIG. 3 illustrates an example of a high torque power tool 70 that may be calibrated in accordance with the present disclosure. FIG. 1 shows an electrically powered high torque power tool 70 comprising a grip 72, an activating trigger 74, a torque multiplier 76, an output spindle 78, and a battery 80. The power tool 70 may also comprise an operator handle 82 that may be adjustable for user comfort and flexibility. The power tool 70 may also comprise a reversing switch (not shown) and may utilize a brushless motor 84 which supplies rotational energy to the output spindle. The output spindle may be a conventional male power tool output fitting having a square cross-sectional shape, although other cross-sectional shapes, such as a spline, may also be used. Various sizes of output fitting, such as ¾ inch and/or 1 inch, may also be provided in exemplary power tools. Further, the power tool 70 may comprise a control unit 86 and memory 88 to control and track the operations of the tool. Typical high torque power tools may provide, depending on a particular model design, torque outputs ranging from about 200 Nm to as high as 4000 or more Nm and output spindle rpm of from about 4 rpm to as high as 110 or greater rpm from a motor speed of typically about 20,000 rpm.

The power tool 70 may also comprise electronic control systems 90, which may comprise a tool control unit 86 and tool data memory unit 88, and which manages operation of the power tool 70 under the control of the tool operator. The power tool 70 electronic control systems 90 may be operatively coupled to the trigger 74 and other user controllable switches or input devices and a multi-function display and user input module 91. The power tool 70 electronic control systems 90 may further be operatively coupled to the battery 80 and the electric motor 84 as well as an internal (to the power tool 70) torque transducer 94 which measures torque output at or from the output spindle 78. The torque transducer 94 at the output spindle 78 and the tool control systems 90 may provide closed-loop transducer control with the transducer 94 to deliver precise torque and accurate, traceable results in the power tool 70 torqueing operations. Using calibration factors stored in the electronic control systems 90, such as in power tool 70 data memory 88, the electronic control systems 90 can monitor the torque output from the output spindle 78 when the power tool 70 is in operation to ensure that an intended torque (the "target torque") is applied to a particular fastener being torqued by the power tool 70. The target torque may be input or changed via the user input module 91.

The power tool 70 may also comprise communications systems, devices or ports, such as cellular communications, Bluetooth, wireless, Ethernet, Fieldbus, USB or other protocols for convenient programming of the tool, data transfer to and from the power tool 70, and/or other process control.

The power tool 70 of FIG. 3 also comprises a torque multiplier 76, which in the illustrated embodiment comprises a gearbox. The torque multiplier 76 receives rotational energy from the motor 79 and employs an epicyclic gear train having one or more stages to produce a higher torque (and lower rotational speed) at the output spindle of the torque multiplier 76 than was received from the motor 79. Each stage of gearing in the torque multiplier 76 multiplies the torque produced at the output spindle 78. Torque multipliers can be designed to produce a range of torque and rpm outputs depending on the intended use of the power tool 70 and the characteristics of the power tool 70 motor 79. The torque multiplier 76 also comprises a reaction collar 92 which in typical fastening operations is coupled to a reaction arm 94 which braces the power tool 70 against counter-rotation in reaction to the torque applied by the power tool 70 on the fastener during fastener operations. The reaction arm 94 can be of varied designs to accommodate use of the power tool 70 in particular fastening operations and to various devices to which the fasteners are being driven.

FIG. 4 shows an exemplary non-portable and non-shippable power tool torque calibration system. Shown in FIG. 4 is a calibration technician 102 standing at a typically large calibration unit 104 in the process of calibrating a power tool 70A. As shown in FIG. 4 the power tool 70A is coupled to a joint simulator 106 which is in turn coupled to and restricted by a large hydraulic pneumatic brake. A reaction arm 94A is secured by a reaction arm brace 110. Systems such as that shown in FIG. 4 are typically operated by highly trained technicians employed by calibration operators who own the calibration systems. Generally, such calibration systems are located in calibration labs geographically dispersed to serve the needs of tool users. In such cases, tools needing calibration are shipped to the calibration labs for calibration thus limiting the use of the tools for the user while the tools are being transported to and calibrated at the geographically dispersed calibration labs. In some cases the large calibration units such as shown in FIG. 4 can be mounted in service trailers that are towed to remote power tool user sites and there operated by the calibration technicians of the calibration labs.

FIG. 5 shows an exemplary high torque power tool 70 such as may be calibrated using the portable calibration system 10 disclosed herein. Shown is the square male output spindle 78 of the power tool 70, the torque multiplier 76 gearbox, the splined reaction collar 92 (with no reaction arm attached to the reaction collar 92) and the handle 72. In certain embodiments of the present disclosure any reaction arms attached to the reaction collar 92 are removed prior to calibration to fully expose the reaction collar 92 for coupling to the mechanical interface of the calibration system 10. It is also noted that in FIG. 5 no battery 80 is shown attached to the power tool 70. A battery 80 or other power source (such as the adaptable power supply 35 described above) should be coupled to the power tool 70 during calibration since operation of the motor is a necessary part of the calibration operation.

Figure 6:
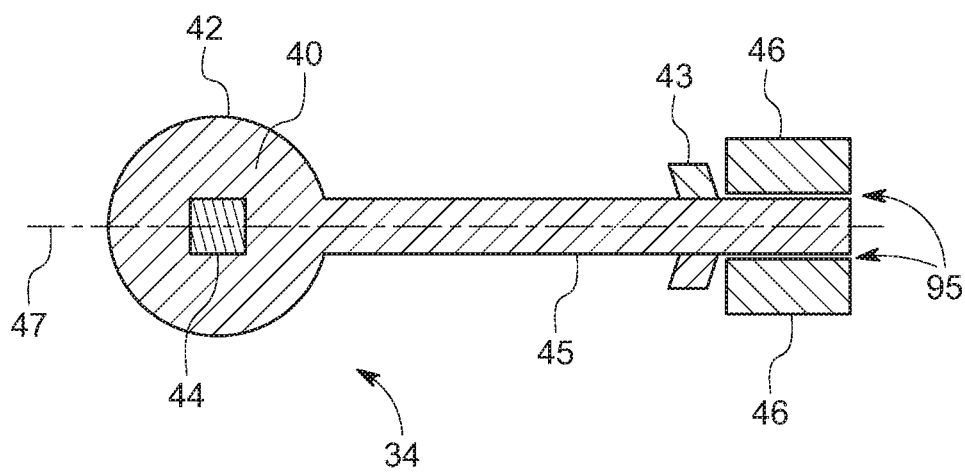
FIG. 6 illustrates a schematic view of a strain gauge based torque transducer that may be used in some embodiments of the present disclosure.
Figure 7:
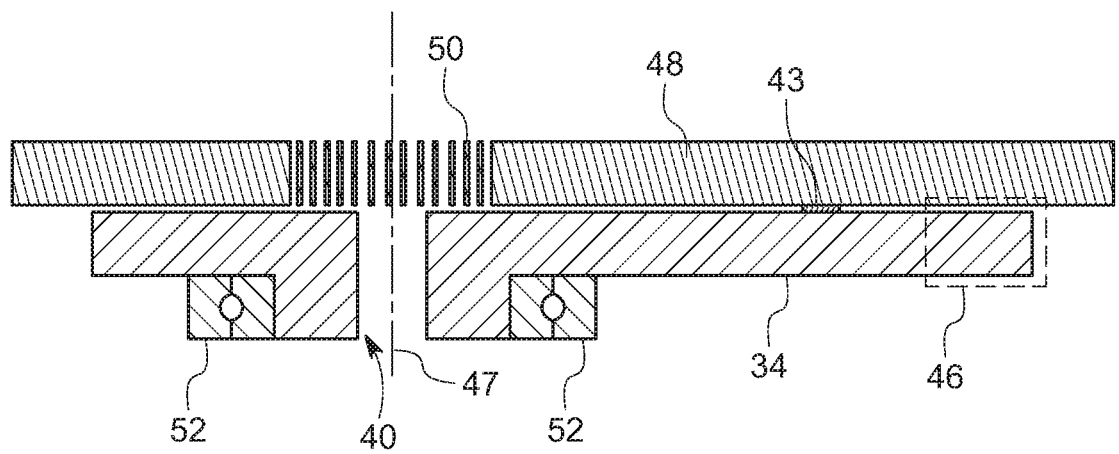
FIG. 7 illustrates a schematic cross-sectional view of a mechanical tool interface according to certain embodiments of the present disclosure.
Figure 8:
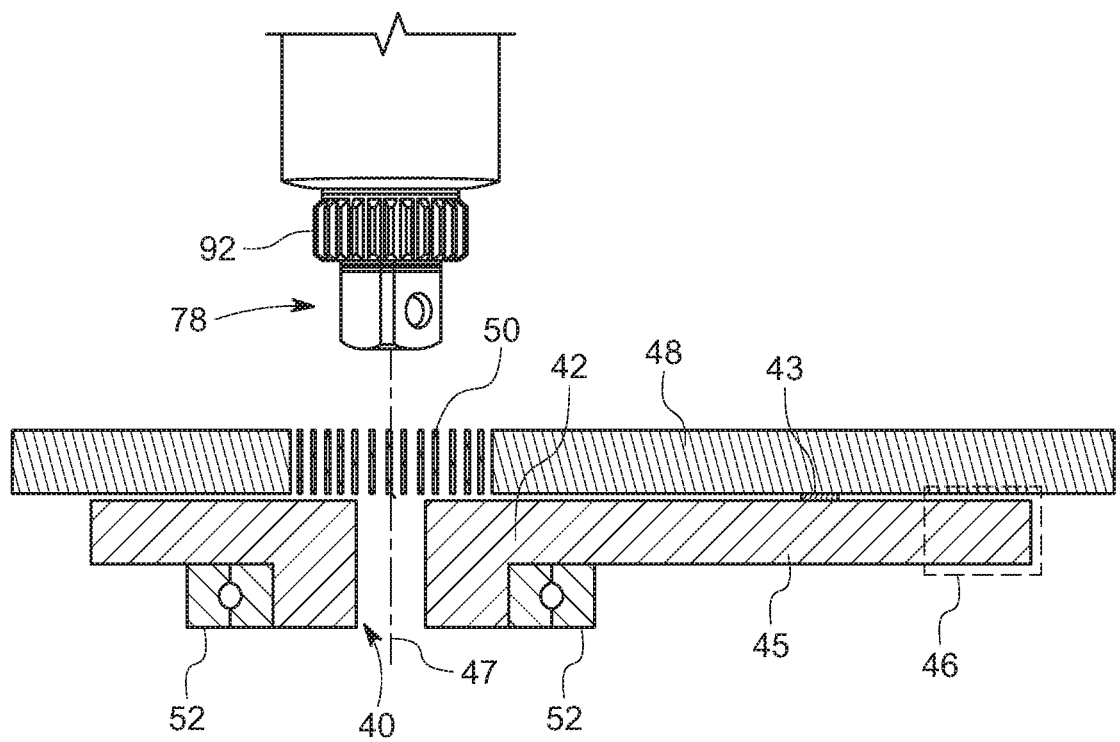
FIG. 8 illustrates a schematic cross-sectional view of a mechanical tool interface juxtaposed with a power tool output according to certain embodiments of the present disclosure.

In the calibration process of the present calibration system 10, the power tool 70 to be calibrated couples with the portable calibration system 10 via the mechanical tool interface 22 and simultaneously operatively couples to the strain gauge based torque transducer 34 as is schematically shown in FIGS. 6-8. As also shown in FIGS. 6-8, the square male output 78 of the power tool 70 can be received in a female square receiver or coupling 40 positioned in a spindle receiving body 42 of the transducer 34. As will be described below, the body 42 of the transducer 34 is mounted in the portable calibration system 10 in such a fashion that it can rotate, to some degree, about an axis 44 of the female square receiver or coupling 40. Rotation of the transducer 34 about the axis 44 of the female square receiver 40 however is arrested by arresting blocks 46 interacting with extension 85 of the body 42. During calibration operations, the electric motor of the power tool 70 is activated (such as by solenoid trigger actuator), rotational energy is transferred into the multiplier gearbox (torque multiplier 76), and a high torque rotational output is transferred from the male square output 78 to the female square receiver 40 of the transducer 34. Whereas the high torque rotational output transferred to the female square receiver 40 acts to rotate or torque the transducer 34 about the axis 44 of the female square receiver 40, such rotation is arrested by arresting blocks 46 and a torque force is applied along an axis 47 of extension 45 of the transducer 34. As torque (stress) is applied to the strain gauge a signal is output to the central processor 18 reflective of the value of the stress applied to the strain gauge by the power tool 70 during power tool calibration.

In some embodiments, arresting blocks 46 are spaced to permit some rotational motion by extension 45 about axis 44 before extension 45 is finally arrested by one of arresting blocks 46. In various embodiments, a space 49 between arresting blocks 46 and extension 45 may be of varying dimensions permitting predetermined rotational movement of extension 45. Further, an angle encoder 43 may be positioned, such as on a top plate 48 (shown in FIG. 7) to measure the rotational displacement or angle displacement of extension 45 or body 42. The angle encoder 43 may be applied in calibration operations which allow for or include some "lost motion" as the transducer rotates either forwards or backwards through the spaces 45 and while the angle encoder 43 measures the rotational movement. Certain precision assembly tools have angle encoders to aid in the fastening process and permit more sophisticated fastening schemes. One sophisticated scheme is termed "snug/angle". This scheme snugs a bolt or fastener to a value, possibly 20% of final torque, then continues rotating the bolt or fastener a prescribed angle before stopping. By allowing "lost motion" while the angle encoder 43 measures rotational movement, the calibration system, can calibrate a power tool 70 for fastening operations such as "snug/angle".

FIG. 7 is a cross-sectional schematic drawing of certain components of the mechanical tool interface 22 of an embodiment of the calibration system 10. Shown is a top plate 48 in which is provided a female receiver or coupling 50 which may be splined and proportioned to couple with the arresting collar 92 of a power tool 70. The top plate 48 may be securely fastened to the shippable case 12 and positioned such as shown in FIG. 1. Positioned below the top plate 48 is the strain gauge based torque transducer 34 of FIG. 6, here shown in side view. The strain gauge based torque transducer 34 may be mounted on bearings 52 such that the transducer 34 may be torqued, to some degree, about the axis 44 of the square female receiver 40. Shown by dotted lines are arresting blocks 46 with may be positioned on either side of the torque transducer extension 45 and may be affixed to the bottom of the top plate 48 or otherwise fixed in position to arrest the movement of the distal end of the torque transducer extension 45.

FIG. 8 shows the cross-sectional schematic of FIG. 7, but also shows a side view of an output spindle 78 with male square output and a splined male reaction collar 92 of a high torque power tool 70, with the power tool 70 positioned to be inserted into the female splined reaction collar 50 receiver in the top plate 48 and to be simultaneously inserted into the female square receiver 40 of the torque transducer. The transducer is positioned relative to the top plate 48 such that when a power tool 70 is coupled to the mechanical interface the splined male reaction collar 92 of the power tool 70 is fully engaged with the female splined reaction collar 50 receiver and the male square output of the power tool 70 is fully engaged with the female square receiver 40 of the torque transducer.

Figure 9:
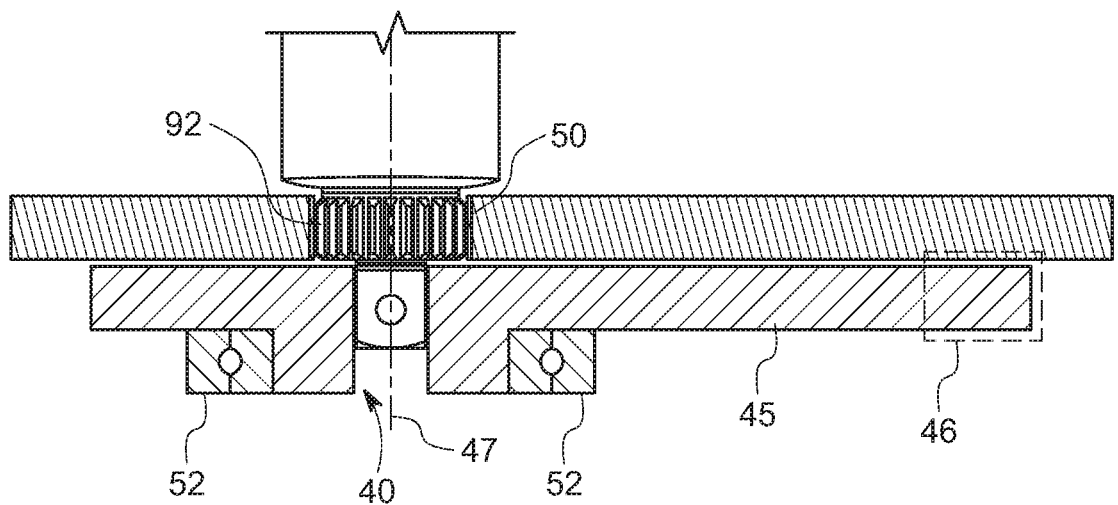
FIG. 9 illustrates a schematic cross-sectional view of the mechanical tool interface of FIG. 8 with the power tool output coupled to the mechanical tool interface.

FIG. 9 shows the components of FIG. 8 with the high torque power tool 70 coupled with the mechanical interface of the calibration system 10 to facilitate calibration of the power tool 70. The splined male reaction collar 92 of the power tool 70 is fully engaged with the female splined reaction collar receiver 50 and the male square output 78 of the power tool 70 is fully engaged with the female square receiver 40 of the torque transducer 34. When, during calibration operations, the motor of the power tool 70 provides rotational power through the gearbox to the output spindle 78, a high torque force is applied from the male square output of the spindle 78 to the female square receiver 40 of the torque transducer 34. Simultaneously the reaction collar 92 of the power tool 70 is locked against the splined surfaces of the female splined reaction collar receiver 50 positioned in the top plate 48 thus inhibiting the power tool 70 from spinning in reaction to the torque being applied to the torque transducer 34.

In some embodiments one or more adapter couplings may be provided in the calibration system to accommodate coupling power tools with varying sizes of reaction collars and or output spindles to the mechanical interface of the calibration system.

Calibration Process

As described previously, the present disclosure relates to a portable, shippable calibration system 10 for power tools, including particularly, high torque power tools. The system may comprise unique electrical and mechanical components and systems in a robust shipping case which is easily transportable and shippable but also protects the hardware during shipping. Embodiments of the system can be shipped to virtually any customer site needing calibration updates on their power impact tools. For example, in some instances, a supply site, whether local or centralized, of portable, shippable calibration systems can be maintained and power tool 70 users desiring calibration of their tools can simply request shipment and delivery of the portable and shippable calibration system 10 from the supply site. In such instances the power tool 70 user may pay a fee to the calibration system 10 provider, rent the calibration systems for her/his own use, or provide other compensation to the calibration system 10 provider. When the shippable calibration system 10 is received, the user can, with the automatic features of the present system, conduct her/his own calibration on the power tools and self-certify the calibration. After the calibration, the shippable calibration system 10 can be shipped back to the local or centralized supply or shipped directly to another tool owner who has also requested shipment and delivery of the calibration system 10. Using this system, a power tool 70 user need not purchase her/his own calibration equipment, but can simply request shipment of the present calibration system 10 and use the system's automated controls to calibrate and certify power tools on site at the tool user's scheduling convenience. Data communications systems in the present calibration system 10 may confirm to the calibration system 10 provider that the calibration system 10 was received and used at the requested site as well as archiving power tool 70 calibration and other data.

During calibration operations, and in overview, the calibration system 10 will measure the torque provided by the power tool 70 between the splined reaction collar female receiver 50 and the square receiver 40 of the torque transducer 34 (the "actual torque") and compare actual torque with the "target torque" (the torque the power tool 70 is set to deliver). It should be understood that the power tool 70 operates using signals from its internal torque transducer 94 as processed by a calibration factor stored, typically in non-volatile memory 88, in the power tool 70 to drive the motor 84 to achieve and output the "target torque." Also, and in overview, the calibration system 10 will, after comparing the actual torque with the target torque, then calculate a new and corrected calibration factor for the power tool 70 and upload that new and corrected calibration factor to the memory 88 or otherwise to the electronic control system 90 of the power tool 70. The power tool 70, using this new and corrected calibration factor, should then produce an actual torque (as may be subsequently checked on the present calibration system 10) that corresponds with the target torque to which the power tool 70 has been set.

The present system operates without the necessity of using a joint rate simulator (also known as a run-down adapter) which, in prior art calibration systems, is used to simulate the fastening process of a fastener. In prior art systems, these joint rate simulators are typically mounted in-line between the tool's drive and the torque tester or sensor and also typically are designed to operate in a clockwise direction only. During such prior art calibration operations, torque is applied until the joint simulator 106 is run down and the tool shuts-off and torque readings are analyzed. Then the joint simulator 106 must be backed off to an appropriate position before a subsequent torque measurement is made. Different joint simulators 106 are required for different output spindle 78 sizes and targeted calibration torque levels. Typical joint simulators 106 may comprise numerous gears, such as planetary gears, to gear up the simulator and also comprise a brake for a heightened brake effect during calibration testing. The present system eliminates the need for the gearing and brake of the joint simulator 106 as well as the joint simulator 106 itself.

The present calibration system 10 may be used to provide a certificate of calibration that accords with the standards of the National Institute of Standards and Technology (NIST). Such an NIST qualified calibration certificate can be generated and uploaded for each power tool 70 calibrated.

In other words, rather than a calibration system looking to the entire spin-down of a joint simulator 106 (as prior art systems have done), with the present system full power is applied by the power tool 70, the control unit runs the power tool 70 until it reaches the torque to which it is set (as measured by the power tool transducer 94 associated with the output spindle), then a comparison is made between the torque to which the power tool 70 is set to apply (the targeted torque) and the torque measured by the calibration system 10 (the actual torque). If any differences between the targeted torque and the actual torque are detected, the calibration system 10 calculates a corrected factor (or new factor) that is communicated to the memory unit that corrects any drift or other inaccuracy that is shown by the actual torque compared to the target torque. Next, the calibration can be repeated to see if the tool (using the newly uploaded corrected factor) will produce an actual torque that equals or is acceptably close to the target torque.

Figure 10:
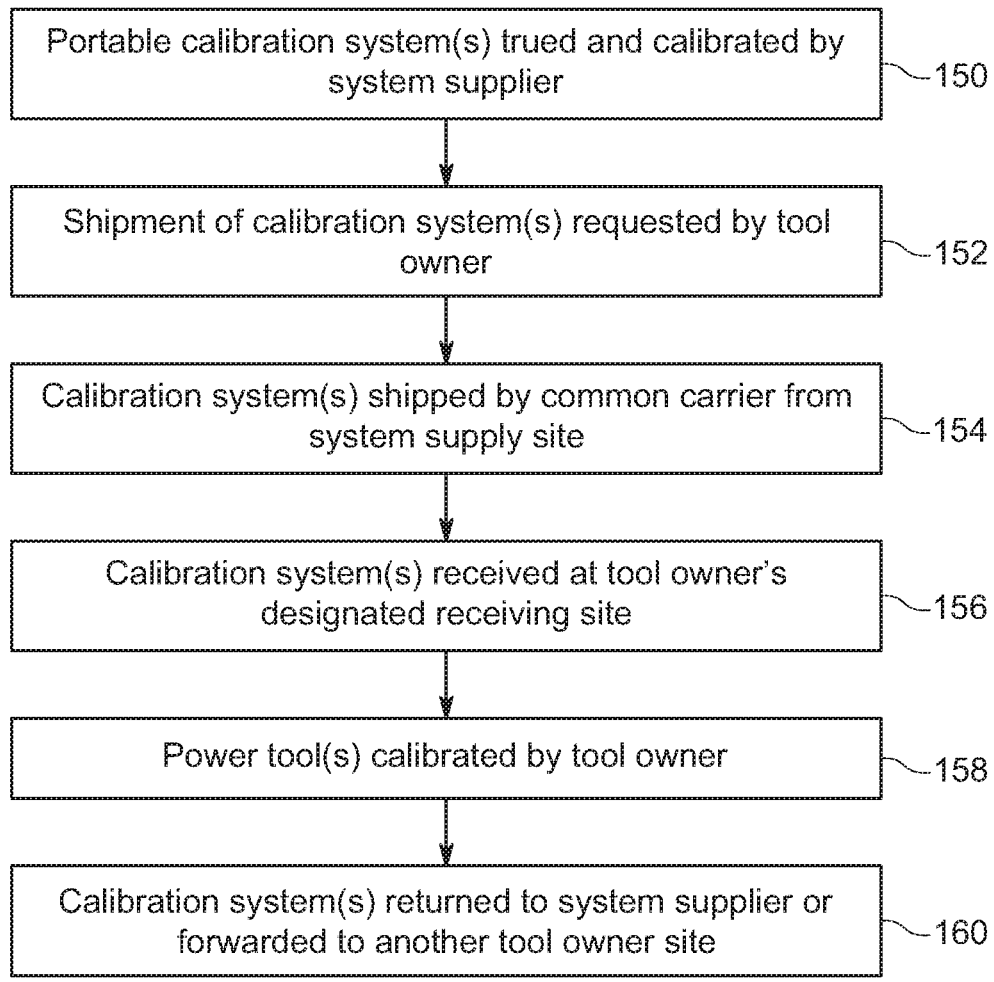
FIG. 10 is a process flow chart of a shippable calibration system supply process.
Figure 11A:
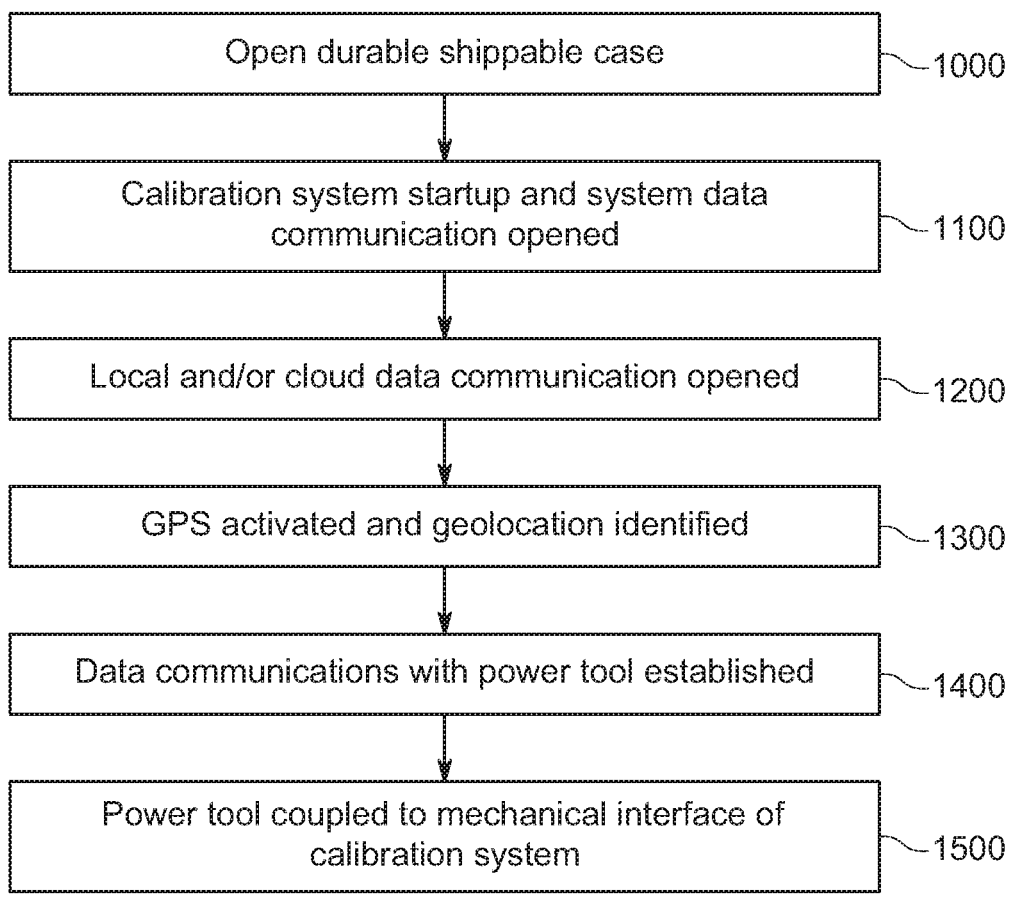
FIGS. 11A-E illustrate exemplary process flow charts of a calibration process according to certain embodiments.
Figure 11B:
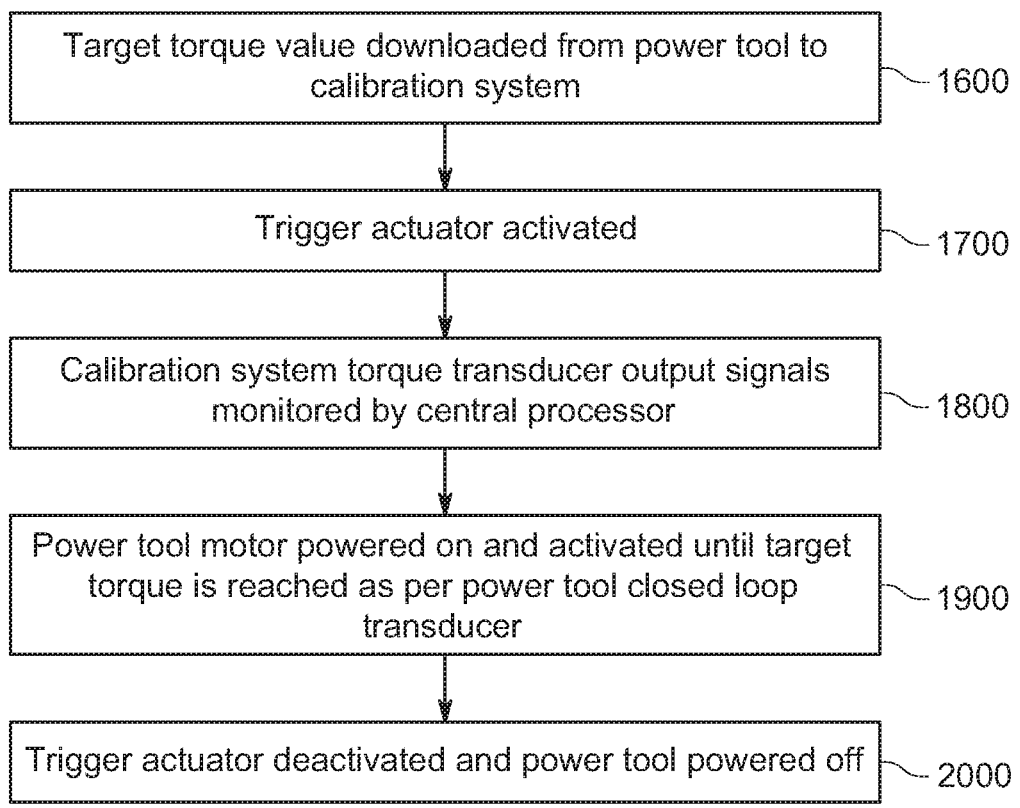
Figure 11C:
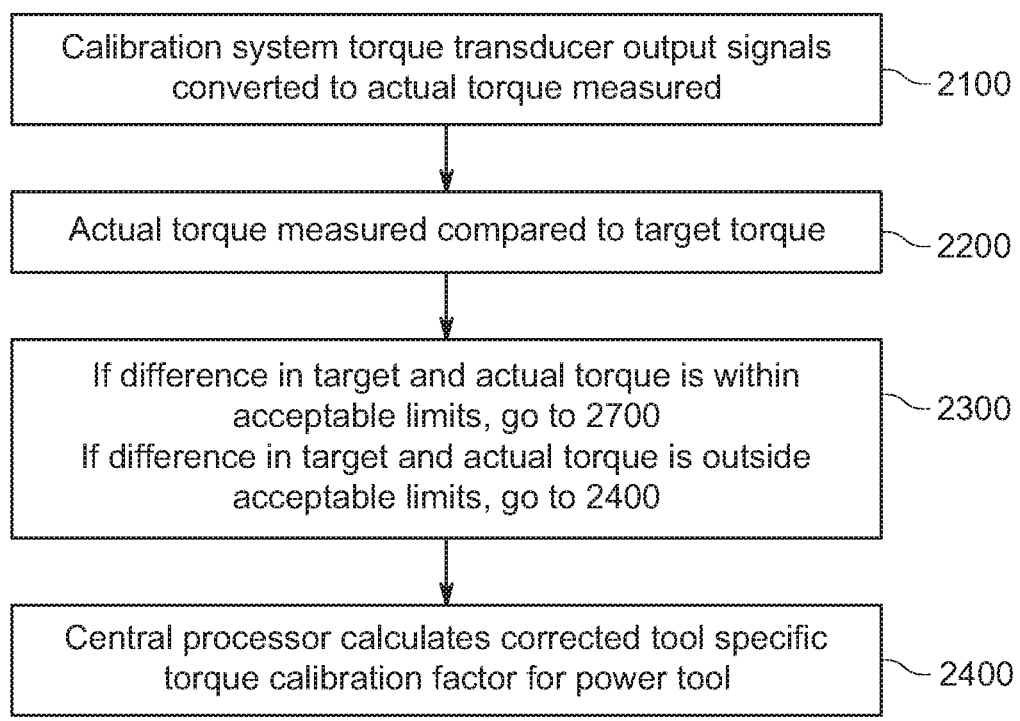
Figure 11D:
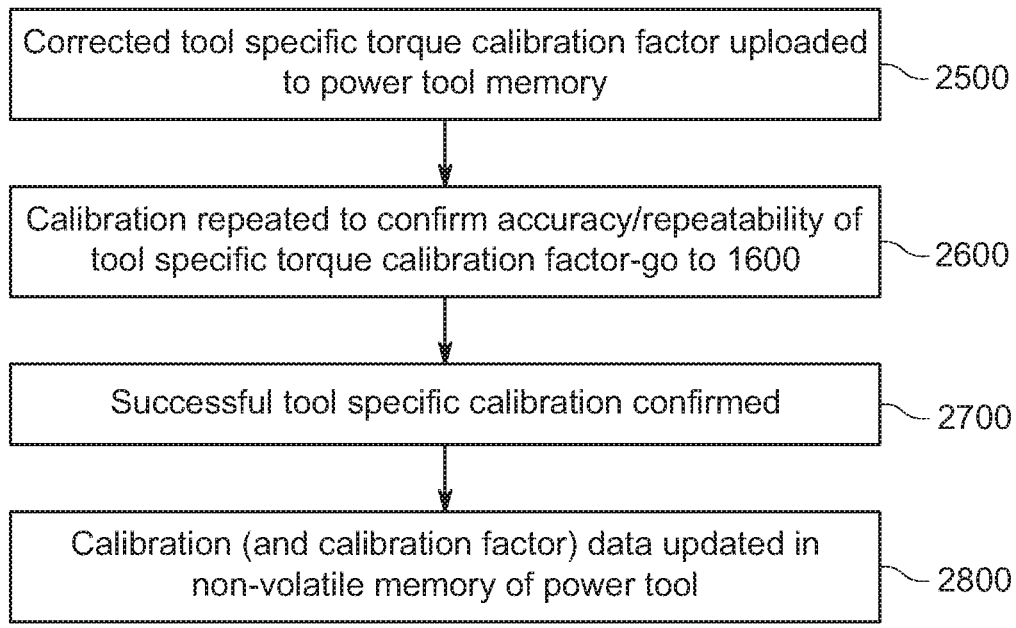
Figure 11E:
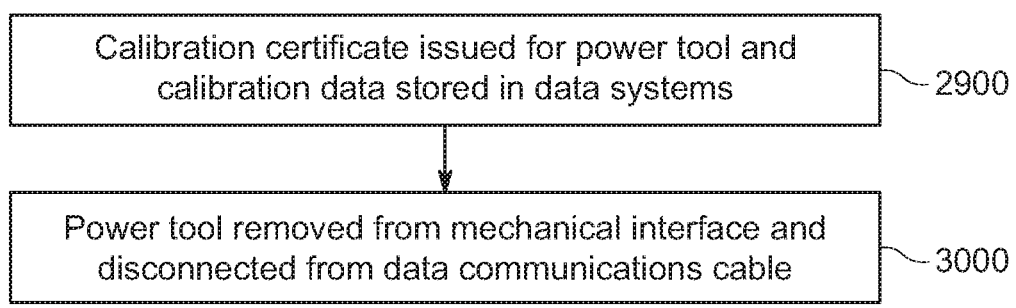

FIG. 10 shows an overview of the use of the present calibration systems in calibrating power tools at geographically dispersed locations. At 150 one or more portable calibration systems according to the present disclosure are trued and calibrated by a system provider, typically at a system provider supply or calibration site. Calibration of the systems may be accomplished by known techniques to ensure that the calibration system(s) themselves are accurately calibrated in preparation for shipment to and use by power tool 70 owners in calibrating their own power tools. Further, at 150 data archives stored on the calibration system 10, including power tool 70 firmware and software updates, may be updated. Also, calibration system 10 firmware and software may be updated. At 152 shipment of one or more calibration systems 10 may be requested by a tool owner or other entity. At 154 one or more calibration systems 10 are shipped, such as by common carrier or other system, from a calibration system 10 supply site to a location identified by the tool owner. At 156 the one or more calibration systems 10 are received at the tool owner's designated or identified receiving site or sites. At step 158 one or more power tools 10 are calibrated using the calibration system 10 of the present disclosure at a location chosen by the tool owner or other entity. Such calibration may be carried out by operators without a high level of calibration and certification training inasmuch as the calibration system 10 of the present disclosure may be largely self-contained, calibration instructions are provided to the operators by the calibration system 10, and calibration procedures are automatically carried out by the calibration system 10 based on the data the system detects from each power tool 70 during the system's data communications with the power tool 70. At the conclusion of a calibration, data regarding the specific power tool 70, the location and date of the calibration, and an NIST qualified certificate of calibration can be uploaded into data archives. After calibration of the intended power tools is completed, the one or more calibration systems (10) may be shipped and returned 160 to the system supplier or forwarded to another tool owner site. Such shipment may be carried out by common carrier or other shipment methods.

FIGS. 11A-11E show an exemplary process for carrying out calibration of a power tool 70 using the system of the present disclosure. This process may be implemented by a power tool owner or other entity after receiving one or more calibration systems 10 such as at step 156 of FIG. 10. At step 1000, if not already done, the durable shipping case 12 may be opened and the user interface 16, mechanical interface 22 and other ports presented to the operator. At 1100 the calibration system 10 may be powered on. The calibration system 10 operating system and central processor 18 may boot up (if not already operating) and data communication with the components of the calibration system 10 may be opened. At 1200 local and/or cloud data communication channels may be opened by the calibration system 10. Operator input may be used to identify or log in to appropriate local data communication systems (such as WIFI or Ethernet) and/or to identify or log in to appropriate data archives. Such data archives may comprise archival records for the power tools to be calibrated and may comprise local or cloud based archives provided by the tool owner or hosted by third parties, including by the supplier of the portable calibration systems. At 1300 the GPS systems 28 may be activated, the geolocation of the calibration system 10 identified, and that geolocation communicated to the central processor 18 or system software for use by the calibration system 10. At 1400 data communications with a particular power tool 70 to be calibrated may be established. This may be accomplished, typically, by connecting the calibration system 10 and the power tool 70 by USB cable 38, although cables using other protocols may be used. Additionally, wireless communications such as Bluetooth or other protocols may be used to communicate between the power tool 70 and the calibration system 10. With data communications established between the power tool 70 and the calibration system 10, the calibration system 10 may download from the power tool 70 a "birth certificate" or other data identifying the particulars of the tool being calibrated. The power tool 70 identity may also be identified by reading a bar code on the power tool 70 using a bar code reader (not shown) supplied with the calibration system 10. With this bar code supplied identity, the calibration system, using its own data files or by accessing local or cloud-based files can retrieve all necessary data for calibration of the power tool 70. Further, the calibration system 10 can perform a check of the power tool 70 with data or records available locally or on the cloud to see if any firmware or software updates are recommended for the power tool 70. The firmware or software updates can be downloaded via the communications systems of the calibration system 10 and be uploaded to the power tool 70 or be uploaded to the power tool 70 directly from data archives in the calibration system 10 itself At 1500 the power tool 70 may be coupled to the mechanical interface 22 of the calibration system 10 such as is shown in FIG. 9. Additionally at 1500 a trigger actuator 39 controlled by the central controller 18 may be fixed to the power tool 70 so that, under control from the central controller 18, the trigger actuator 39 can activate the trigger 74 of the power tool 70, thus supplying electrical energy to the motor 70 and providing torque output from the output spindle 78 to the square female receiver 40 of the mechanical interface 22 of the calibration system 10. At 1600 the target torque value is downloaded from the power tool 70 to the calibration system 10. This step 1600 may also be accomplished at 1400 when data communications between the power tool 70 and the calibration system 10 are established. At 1800 it is confirmed that the output signals of the calibration system 10 torque transducer 34 are being monitored. With communications established between the power tool 70 and the calibration system 10, the target torque downloaded from the power tool 70 to the calibration system 10, the power tool 70 coupled to the mechanical interface 22 of the calibration system 10 and confirmation of this coupling confirmed, and the output signals of the calibration system 10 torque transducer 34 being monitored, the calibration system 10 is ready for the actual calibration to occur.

At 1900 the central controller 18 activates the trigger actuator 39. With the trigger 74 actuated the motor 84 is powered on and torque is output from the output spindle 78 into the female square receiver 40 of the calibration system 10. The power tool 70 control system 90 continues to provide electric power from the battery 80 to the motor 84 while monitoring signals from the power tool 70 torque transducer 94 measuring torque from the output spindle 78 until the power tool 70 controller calculates—based on the power tool 70 torque transducer 94 output signals and the calibration factor already in the power tool 70 memory 88—that the power tool target torque has been attained. At this point, the power tool control system 90 switches power to the motor 84 off and the tool rotational torque output ceases. During this step 1900 the output signals of the calibration system 10 torque transducer 34 are monitored and are used by the calibration system 10 central controller 18 to calculate the actual torque received at the calibration system 10 from the power tool 70. At 2000 the central controller deactivates the trigger actuator 39 and the trigger 74 is returned to the off position.

At 2100 the output signals from the calibration system 10 torque transducer 34, if not already processed (such as at 1900) are processed by the central controller 18 and the actual torque output of the power tool 70 to the calibration system 10 is calculated. At 2200 the actual torque measured is compared to the target torque by the central controller 18. At 2300 is shown the decision step or operation of the calibration system 10 depending on the difference between the target torque and the actual torque. If the difference is within acceptable limits, the process moves to step 2700. If the difference is outside acceptable limits the process moves to step 2400.

At 2400 the central processor 18 calculates a proposed corrected tool specific torque calibration factor for the power tool 70 being calibrated. The central processor 18 calculation may take into account various particulars of the design and operating software/firmware of the power tool 70 to determine the appropriate proposed corrected tool specific torque calibration factor for the particular power tool 70. At 2500 the proposed corrected tool specific torque calibration factor is uploaded to the power tool memory 88, which typically may be non-volatile memory. At 2600, the process returns to step 1600 and the calibration process is repeated using the newly proposed corrected tool specific torque calibration factor. After this repeated calibration operation, at step 2300 again if the difference in target and actual torque is within acceptable limits, the process proceeds to step 2700.

At 2700, successful tool specific calibration is confirmed and at 2800 calibration (and calibration factor) data is updated and/or uploaded into memory of the power tool 70, which is typically non-volatile memory. The data that can be updated or uploaded includes the newly determined calibration factor and other data such as the date and location of the calibration, identification information of the calibration system 10 by which the calibration was conducted. At 2900 a calibration certificate may be issued for the power tool 70 and stored in local and/or cloud based data systems and the full calibration record, or portions thereof, may be uploaded to the power tool 70 memory 88, to local data storage (such as a facility computer and data system, to memory drives 30 on the calibration system 10, and to data systems on the cloud which may be accessed via the internet from any location with the appropriate authorization such as an ID and password. A calibration certificate may also be uploaded to the power tool 70 and stored in power tool 70 memory 88. Additionally, more complete data, including all data regarding the calibration of the power tool 70 may be uploaded to local and/or cloud based data systems.

Finally, at 3000 with calibration completed, the power tool 70 may be removed from the mechanical interface 22 and disconnected from any data communications cables that may have been connected between the power tool 70 and the calibration system 10.

In certain embodiments, the portable calibration system may be used to calculate separate calibration factors (for the same tool) at different target torques and such separate calibration factors for different target torques may be stored in the electronic control systems 90 of the tool. In other words, for the same tool the portable calibration system may calculate and upload to electronic control systems a calibration factor X1 for target torque Y1 of the power tool 70. In a separate calibration process, the portable calibration system 10 may calculate a second calibration factor X2 for target torque Y2 of the power tool and upload the second calibration factor X2 to the electronic control systems 90 such that when via user interface 91 or other means the power tool 70 is set to a target torque Y2, the power tool will utilize calibration factor X2 instead of X1. And, alternatively if the tool is set to target torque Y1 it will use calibration factor X1. Any number of target torques Yn and calibration factors Xn may be applied, calculated and uploaded to provide specifically accurate torque values at varying target torques of the power tool.

A series of adapters may also be included in the calibration system 10 to facilitate coupling of power tools 10 having different sizes or configurations of reaction collars 92 and/or different sizes or configurations of output spindles 78 from that shown in FIGS. 7-9 with the mechanical interface 22 of the calibration system 10.

Figure 12A:
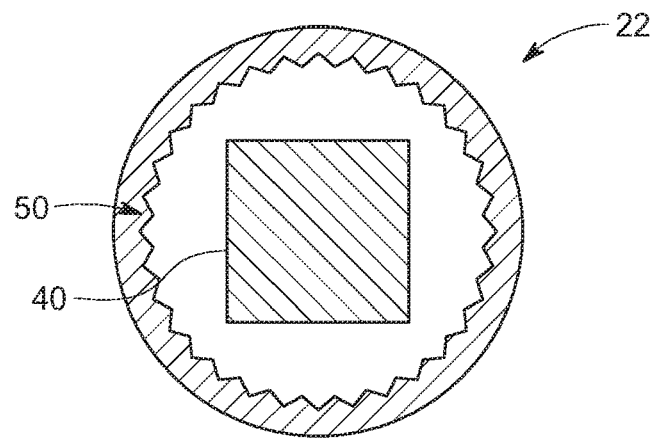
FIGS. 12A-12C illustrate exemplary adapters for different sized power tools and the portable calibration system.
Figure 12B:
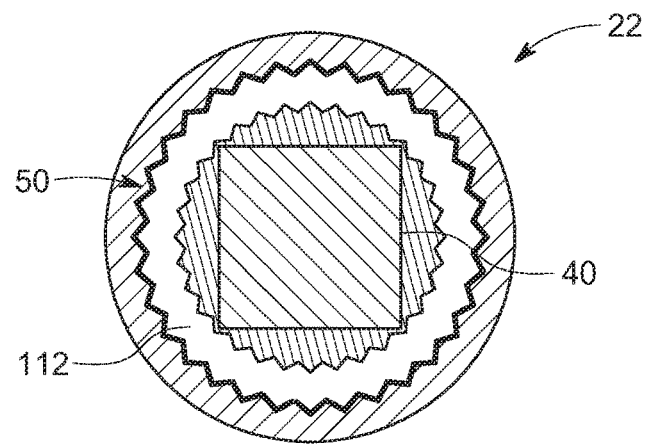
Figure 12C:
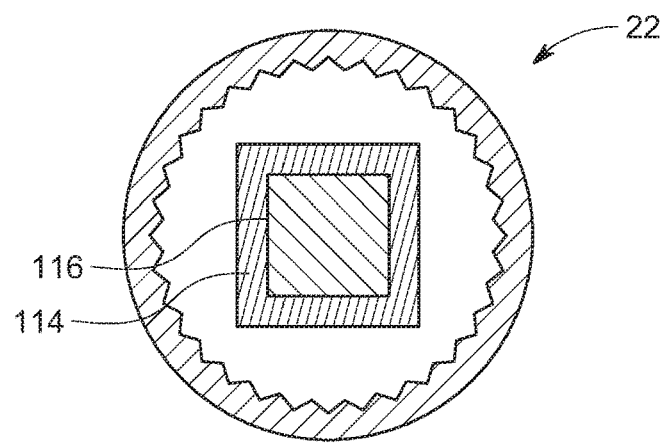

One example of such an adapter is shown in FIGS. 12A-12C. FIG. 12A represents a view of an embodiment of mechanical interface 22 and shows female splined receiver or coupling 50 and female square receiver 40 as each may be sized to mate with particular reaction collars 92 and output spindles 78 of certain power tools. FIG. 12B shows an embodiment of a reaction collar spacer 112 having an outer circumferential surface of a shape and diameter to mate with the female splined surface of coupling 50 and also having an inner circumferential surface of a shape and diameter to mate with a male splined surface of a tool reaction collar that is of a smaller diameter than the diameter of coupling 92. Shown in FIG. 12C is a tool output adapter 114 which has an outer shape and diameter to mate with the female square receiver 40 and an inner shape and diameter to receive the square output spindle of a power tool having a smaller square output than element 78 sized to mate with female square receiver 40. The adapters 112 and 114 may have horizontal dimensions or thicknesses sized to mate with the various elements of mechanical tool interface 22. Additionally, further adapters of different sizes or internal shapes may be used to accommodate a variety of tool collar and output sizes and shapes.

Figure 13A:
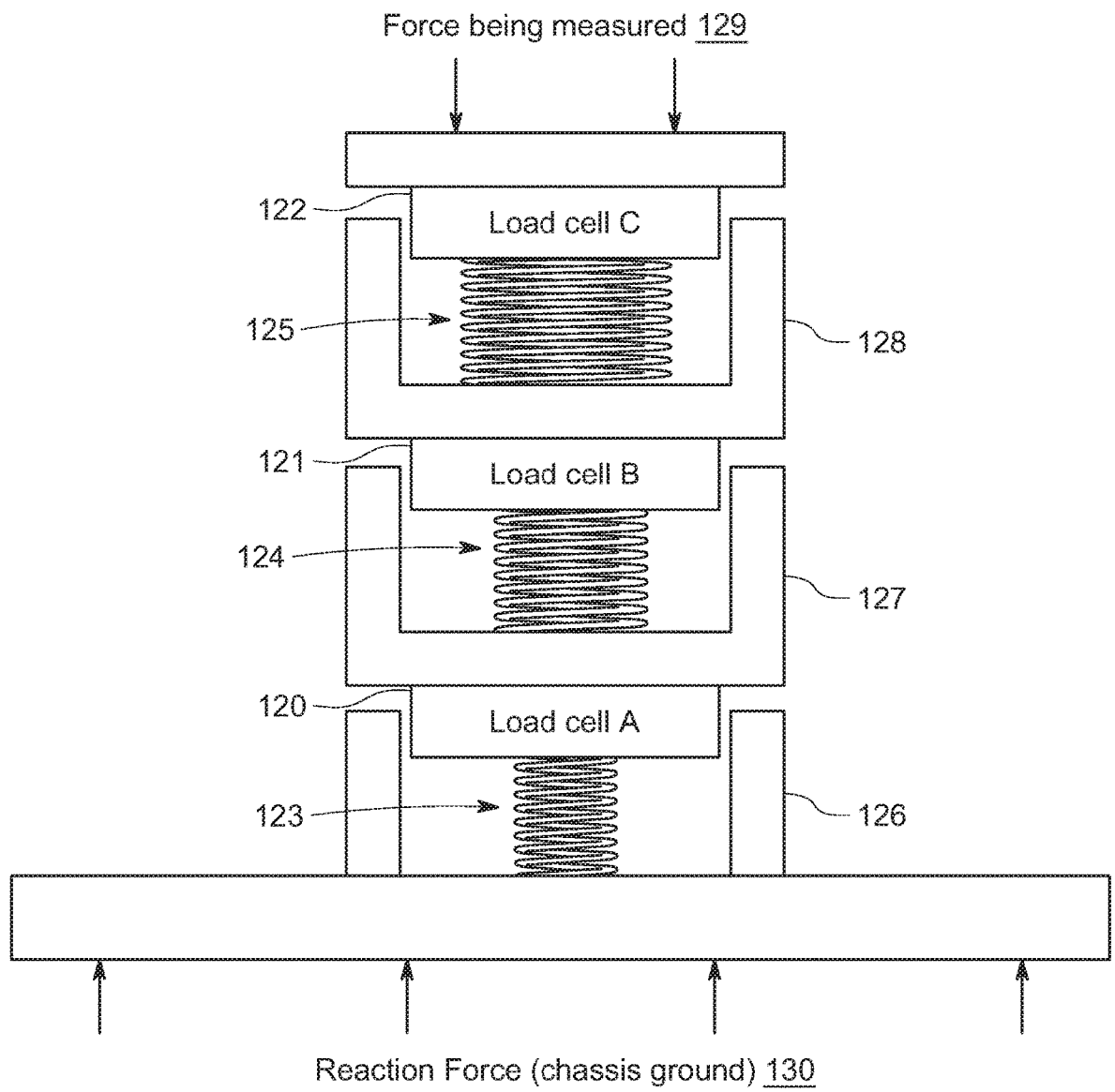
FIGS. 13A-13C illustrate exemplary cascading load cells as may be included in the portable calibration system.
Figure 13B:
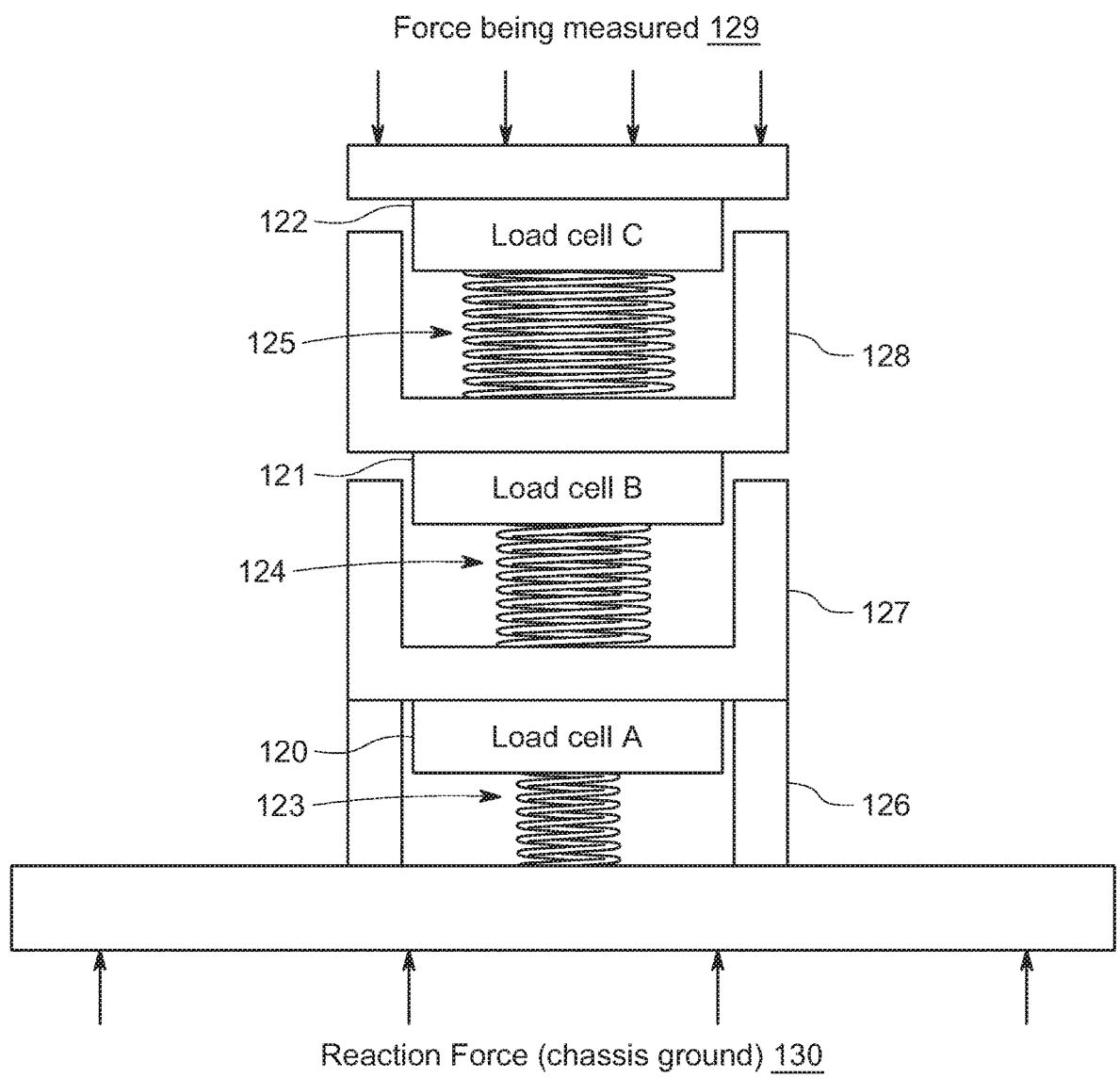
Figure 13C:
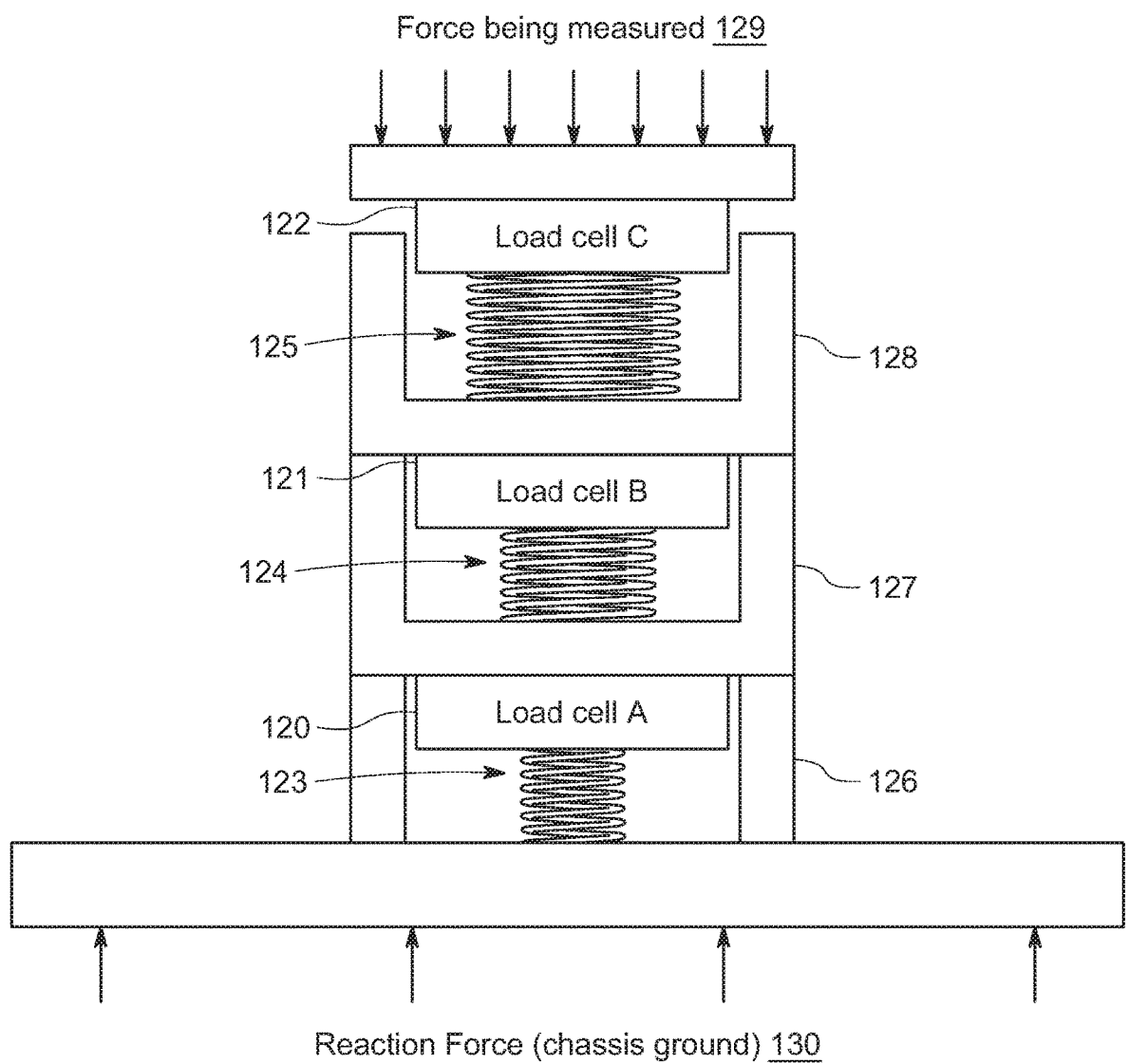

Further, the calibration system 10 may comprise variations on the torque transducer 34 shown in FIGS. 6-9. For example, the torque transducer may alternately comprise a plurality of torque transducer elements integrally formed with the female square receiver 40 of the torque converter of FIG. 6. This plurality of torque transducer elements may provide a cascading set of torque transducers such as illustrated in FIGS. 13A-13C. The plurality of torque transducer elements illustrated in FIGS. 13A-13C show how transducers or load cells can be combined in stages to achieve both high resolution at low loads and also be capable of reading high loads without suffering damage. Such cascading torque transducer systems, incorporated into the portable calibration system 10, provides a wide range of torque sensing capability and thus may be used to calibrate a variety of tools, from those outputting a relatively low torque to those outputting a relatively high torque while still providing high torque accuracy through the entire range of cascaded load cells.

The example of FIGS. 13A-13C is shown as a linear system but the system of cascading load cells can be applied in a rotary application such as shown in FIGS. 6-8. In FIGS. 13A-13C are shown a cascaded set of load cells 120, 121, and 122, comprising varying springs—a light spring 123 in load cell 120, a medium spring 124 in load cell 121 and a heavy spring 125 in load cell 122—and each spring protected by respective overload supports 126, 127 and 128. Also shown is a force being measured 129 and a reaction force or chassis ground 130. Load cell 120 has a low capacity rating, load cell 121 has a medium capacity rating and load cell 122 has a high capacity rating.

Figure 14:
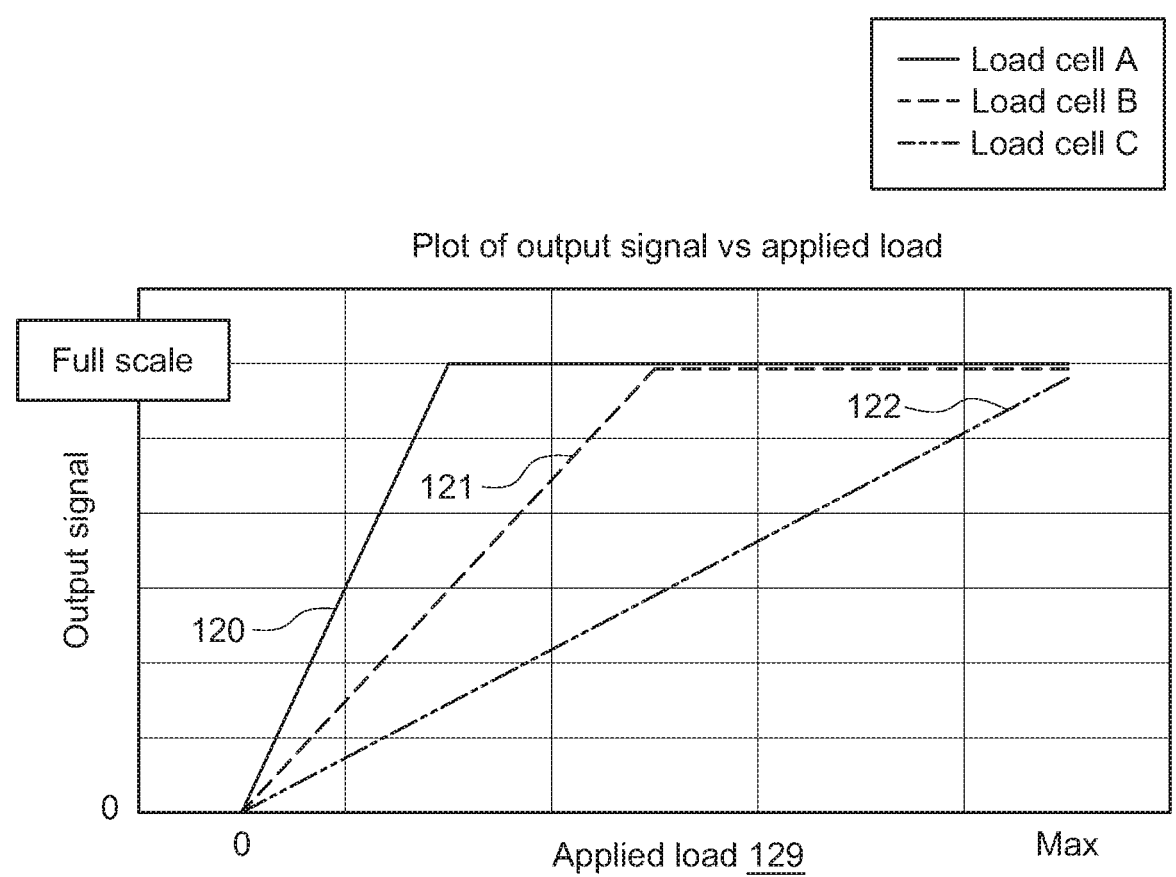
FIG. 14 shows an exemplary plot of output signal vs applied load for cascading load cells.

Signals from each load cell (120, 121 and 122) are communicated to a microprocessor (such as central processor 18). Depending on the amount of force being measured 129, signals from individual ones of load cells 120, 121 or 122 are analyzed to accurately determine the force being measured 129. The microprocessor uses one load cell reading at a time, depending on the values read from the load cells. The microprocessor is programmed with a map (such as shown in FIG. 14) that defines transition points (load values) for determining which load cell reading the microprocessor is to use to determine the force being measured 129.

Shown in FIG. 13A is the cascading set of load cells with a force applied 129 that is appropriate for the operating range of light spring 123 of load cell 120—or, in other words, in a condition in which load cell 120 is active. In this circumstance the microprocessor (such as central processor 18) analyzes the reading from active load cell 120 to determine the force being measured 129.

FIG. 13B shows the cascading set in which a greater force 129 is applied than in FIG. 13A and wherein the force 129 is appropriate for or within the operating range of medium spring 124. In this circumstance, load cell 120 is protected from overloading by overload support 126 and load cell 121 is active. Also in this circumstance the microprocessor (such as central processor 18) analyzes the reading from active load cell 121 to determine the force being measured 129.

FIG. 13C shows the cascading set in which a greater force 129 is applied than in FIG. 13B and wherein the force 129 is appropriate for or within the operating range of heavy spring 125. In this circumstance, load cells 120 and 121 are protected from overloading by overload supports 126 and 127 and load cell 122 is active. Also in this circumstance the microprocessor (such as central processor 18) analyzes the reading from active load cell 122 to determine the force being measured 129.

FIG. 14 shows an example of a map defining transition points (load values) for the microprocessor's determination of which load cell's 120, 121, or 122 signal to use in determining the force being measured 129. FIG. 14 shows a plot of load cell output signal vs applied load (force being measured 129). Shown are output signals for each of load cells 120, 121 and 122. At relatively low Applied Load values the microprocessor will calculate the applied load (129) based on signals from load cell 120 as the plot for output signal of load cell 120 rises to "full scale". As the output signal for load cell 120 reaches "full scale," load cell 120 has reached its rating limit and overload support 126 protects load cell 120. At approximately this point in the "Applied Load" scale, the microprocessor switches to calculate the applied load (129) based on signals from load cell 121. As the output signal for load cell 121 reaches "full scale" load cell 121 has reached its rating limit and overload support 127 protects load cell 121 (and load cell 120 has already reached its rating limit and is similarly protected by overload support 126). At approximately this point in the "Applied Load" scale, the microprocessor switches to calculate the applied load (129) based on signals from load cell 122. By such a cascading set of load cells, the calibration system 10 can safely and accurately measure the torque of tools having a broad range of torques.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A portable high torque power tool torque calibration system, comprising:

a portable shippable container in which are mounted a mechanical tool interface, a user interface and central processor unit;

the mechanical interface including a female reaction collar coupling and a square spindle female coupling jointly mounted to simultaneously couple with a male reaction collar and a male square output spindle of a high torque power tool to be calibrated, and configured such that the mechanical interface simultaneously locks the power tool against spinning relative to an axis of rotation of an output spindle of the power tool and receives torque output from the output spindle of the power tool;

the mechanical interface further comprising a torque transducer and a top plate, the torque transducer operatively connected to the central processor, the top plate including at least one arresting block and configured to mount the reaction collar coupling and the at least one arresting block configured to arrest the torque transducer against rotation, wherein the square spindle coupling defines an axis through the center of the square spindle coupling and a spindle receiving body, the spindle receiving body is configured to be mounted on at least one bearing, and the spindle receiving body and the torque transducer are at least partially rotatable about the axis of the square spindle coupling, and the central processor unit configured to process signals received from the torque transducer and calculate and upload to the power tool being calibrated a calibration correction factor specific to the power tool being calibrated.

2. The calibration system of claim 1 further comprising:

an electronic data physical connection port mounted to the calibration system and configured to be connected via data cable to an electronic data physical connection port of a power tool being calibrated; and wherein the central processor is configured to download specific tool identification information from a power tool being calibrated via the electronic data physical connection port.

3. The calibration system of claim 2 wherein:

the central processor is configured to upload at least one calibration correction factor to a power tool being calibrated, such calibration correction factor being specific to the particular power tool.

4. The calibration system of claim 3 wherein:

the central processor, based on data downloaded from the power tool being calibrated, is configured to identify an appropriate calibration process for the particular power tool being calibrated; and is further configured to activate a trigger actuator coupled to a trigger of the power tool, to identify when the tool control unit determines that the tool has reached its target torque output, to process signals received from the torque transducer to determine the actual torque received at the mechanical interface from the power tool operating at its target torque output, to compare the actual torque with the target torque, to compute a new calibration correction factor for the power tool at that target torque output, and to upload the new calibration correction factor to the data memory unit of the power tool.

5. The calibration system of claim 1 wherein:

the central processor is configured to receive a target torque setting from the power tool being calibrated, to process signals from the torque transducer and to calculate a calibration correction factor based on the signals and the target torque, and to upload the calculated calibration factor to the power tool.

6. The calibration system of claim 1 configured such that a power tool can be coupled to the female reaction collar coupling and the female output spindle coupling, the power tool power source activated, the power tool providing a target torque output to the female square coupling that is measured by the torque transducer.

7. A portable high torque power tool torque calibration system, comprising:

a portable shippable container in which are mounted a mechanical tool interface, a user interface and central processor unit;

the mechanical interface including a female reaction collar coupling and a square spindle female coupling jointly mounted to simultaneously couple with a male reaction collar and a male square output spindle of a high torque power tool to be calibrated, and configured such that the mechanical interface simultaneously locks the power tool against spinning relative to an axis of rotation of an output spindle and receives torque output from the output spindle of the power tool;

the mechanical interface further comprising a torque transducer and a top plate, the torque transducer operatively connected to the central processor, the top plate including at least one arresting block and configured to mount the reaction collar coupling and the at least one arresting block configured to arrest the torque transducer against rotation, wherein the square spindle coupling defines an axis through the center of the square spindle coupling and a spindle receiving body, the spindle receiving body is configured to be mounted on at least one bearing, and the spindle receiving body and the torque transducer are at least partially rotatable about the axis of the square spindle coupling, and the central processor unit configured to process signals received from the torque transducer and calculate and upload to the power tool being calibrated a calibration correction factor specific to the power tool being calibrated; and the calibration system configured to automatically conduct the calibration of a high torque power tool using only power from a self-contained battery system in the calibration system and without the use of an external power supply.

8. The calibration system of claim 7 further comprising:

an electronic data physical connection port mounted to the calibration system and configured to be connected via data cable to an electronic data physical connection port of a power tool being calibrated; and wherein the central processor is configured to download specific tool identification information from a power tool being calibrated via the electronic data physical connection port.

9. The calibration system of claim 7 wherein:

the central processor is configured to upload at least one calibration correction factor to a power tool being calibrated, such calibration correction factor being specific to the particular power tool.

10. The calibration system of claim 7 configured such that a power tool can be coupled to the female reaction collar coupling and the female output spindle coupling, the power tool power source activated, the power tool providing a target torque output to the female square coupling that is measured by the torque transducer.

* * * * *